United States Patent
Bird et al.

(10) Patent No.: US 11,922,454 B1
(45) Date of Patent: Mar. 5, 2024

(54) SYSTEMS AND METHODS FOR PROVIDING PERSONALIZED OFFERS AND INFORMATION IN WEBPAGES

(71) Applicant: RevLifter Ltd., London (GB)

(72) Inventors: Simon Bird, Northamptonshire (GB); Adam Gordon Manners, Waltham Cross (GB); Matt Payne, Northamptonshire (GB)

(73) Assignee: RevLifter Ltd., London (GB)

( * ) Notice: Subject to any disclaimer, the term of this patent is extended or adjusted under 35 U.S.C. 154(b) by 0 days.

(21) Appl. No.: 18/470,178

(22) Filed: Sep. 19, 2023

Related U.S. Application Data

(60) Provisional application No. 63/472,200, filed on Jun. 9, 2023, provisional application No. 63/472,219, filed on Jun. 9, 2023.

(51) Int. Cl.
  *G06Q 30/0207* (2023.01)
  *G06Q 30/0235* (2023.01)

(52) U.S. Cl.
  CPC ..... *G06Q 30/0239* (2013.01); *G06Q 30/0213* (2013.01); *G06Q 30/0235* (2013.01); *G06Q 30/0236* (2013.01)

(58) Field of Classification Search
  CPC .......... G06Q 30/0239; G06Q 30/0213; G06Q 30/0235; G06Q 30/0236
  USPC ............................ 705/14.15, 14.35; 709/228
  See application file for complete search history.

(56) References Cited

U.S. PATENT DOCUMENTS

| | | | |
|---|---|---|---|
| 10,832,318 B1* | 11/2020 | Kothari ................... | G06Q 40/02 |
| 2001/0047413 A1 | 11/2001 | Landau et al. | |
| 2002/0161779 A1* | 10/2002 | Brierley ............. | G06Q 30/0217 |
| | | | 705/14.27 |
| 2003/0033378 A1 | 2/2003 | Needham et al. | |
| 2005/0038893 A1* | 2/2005 | Graham .................. | G06Q 30/02 |
| | | | 709/228 |
| 2006/0224697 A1 | 10/2006 | Norris | |
| 2006/0277477 A1 | 12/2006 | Christenson | |
| 2008/0091517 A1* | 4/2008 | Koonce .............. | G06Q 30/0207 |
| | | | 705/14.1 |
| 2008/0091610 A1 | 4/2008 | Benjamin | |

(Continued)

OTHER PUBLICATIONS

Teng Lee, An Interactive Machine Learning Framework, 2016 (Year: 2016).*

(Continued)

*Primary Examiner* — Tarek Elchanti
(74) *Attorney, Agent, or Firm* — Ahmann Kloke LLP

(57) ABSTRACT

An example method includes detecting, using a user interaction tracking module associated with a website, access of a user of a webpage that is part of the website. The website provides multiple products for sale and is operated by an entity. The user interaction tracking module is provided by an offer aggregator entity that is distinct from the entity. The website has a theme providing a look and feel for the website. The method further includes accessing a profile of the user and identifying, based on the profile of the user, multiple offers to provide to the user. Each offer includes an offer title and a reference to one or more products of the multiple products. The method further includes providing for display to the user in the webpage the multiple offers. Each offer for display includes the offer title and the reference and has the theme of the website.

20 Claims, 15 Drawing Sheets

(56) References Cited

U.S. PATENT DOCUMENTS

| | | | |
|---|---|---|---|
| 2009/0119259 | A1 | 5/2009 | Williams et al. |
| 2010/0042485 | A1 | 2/2010 | Wang et al. |
| 2010/0299616 | A1 | 11/2010 | Chen et al. |
| 2011/0238503 | A1 | 9/2011 | Naini |
| 2011/0258052 | A1 | 10/2011 | Kakade et al. |
| 2013/0111510 | A1 | 5/2013 | Baker et al. |
| 2015/0302456 | A1* | 10/2015 | Rego .................. G06Q 30/0235 705/14.35 |
| 2020/0326824 | A1* | 10/2020 | Alonso ............... G06F 3/04166 |
| 2022/0027944 | A1 | 1/2022 | Han et al. |

OTHER PUBLICATIONS

"RevPage—RevLifter: A personalised deals page that drives incremental revenue," https://web.archive.org/web/20210421180422/ https://www.revlifter.com/revpage/, Archived Apr. 21, 2021, 4 pages.

* cited by examiner

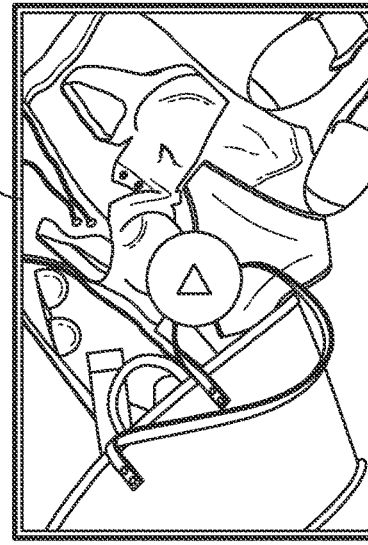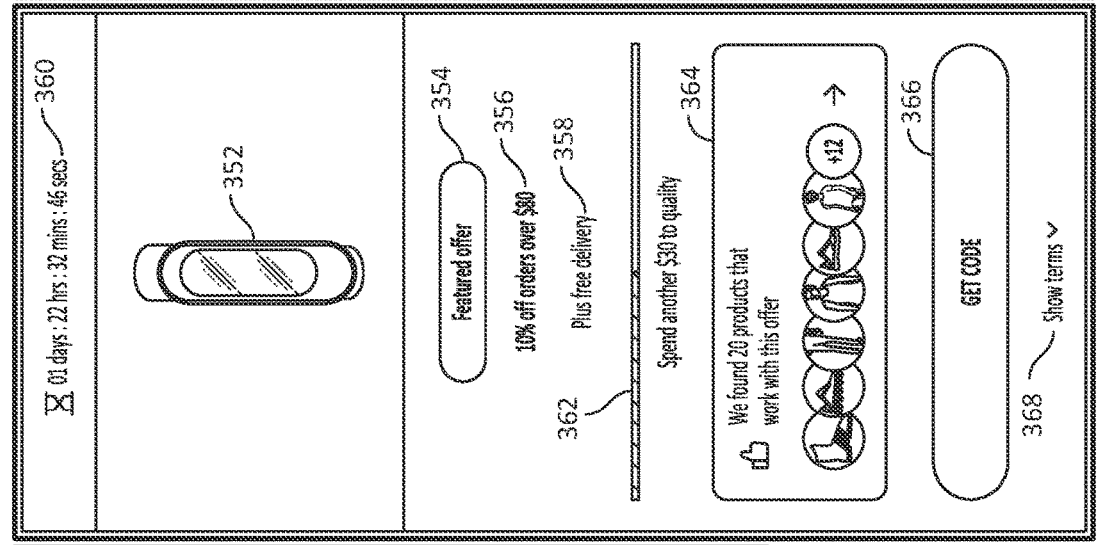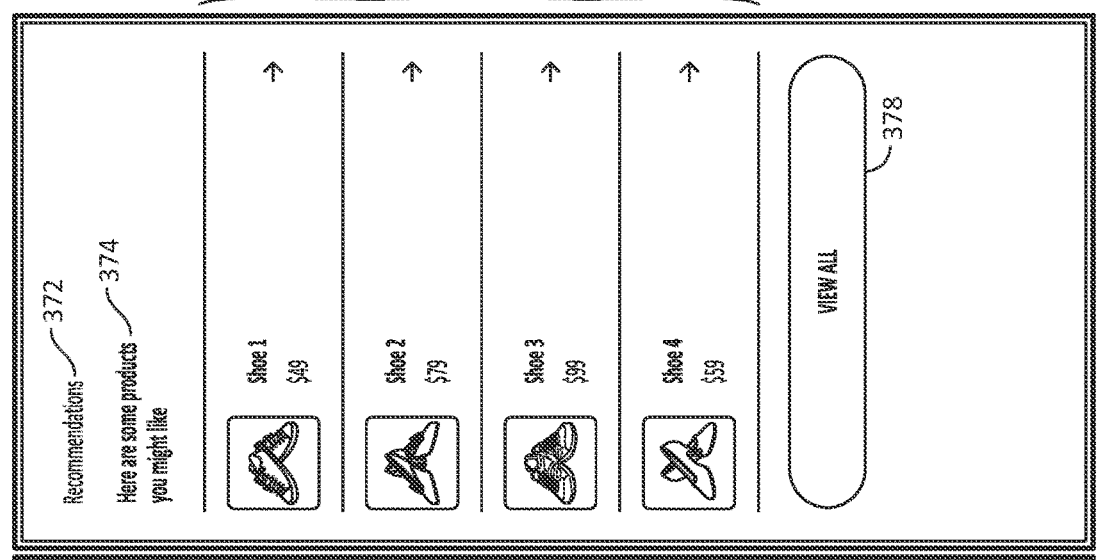

SYSTEMS AND METHODS FOR PROVIDING PERSONALIZED OFFERS AND INFORMATION IN WEBPAGES

CROSS-REFERENCE TO RELATED APPLICATIONS

This application claims priority to U.S. Provisional Patent Application No. 63/472,200, filed on Jun. 9, 2023, and entitled "SYSTEMS AND METHODS FOR PROVIDING WEBPAGES CONTAINING PERSONALIZED OFFERS AND INFORMATION", and to U.S. Provisional Patent Application No. 63/472,219, filed on Jun. 9, 2023, and entitled "SYSTEMS AND METHODS FOR GENERATING OFFERS, CAMPAIGNS, AND RULES FOR INTEGRATION WITH WEBSITES", and is related to co-pending U.S. patent application Ser. No. 18/307,363, filed on Apr. 26, 2023 and entitled "SYSTEMS AND METHODS FOR PROVIDING PERSONALIZED OFFERS AND INFORMATION", each of which is incorporated in its entirety herein by reference.

FIELD OF THE INVENTION(S)

Embodiments of the present invention(s) are generally related to providing personalized offers and information in webpages, and in particular to providing personalized offers and contextual information, such as product or services recommendations, in webpages of websites.

BACKGROUND

A website that provides products or services for sale may provide offers to entice users to purchase a product or service. However, the website may display the offers only on a landing page or home page, and not on other pages of the website. Or the website may display offers only in a navigation section which the user may have to access in order to view the offers. In either case, the user may have difficulty accessing or finding offers on the website.

The user may leave the website to search for offers or discount codes for products or services sold by the website. The user may find third-party websites that purport to provide discount codes, which may also be referred to as promo codes or coupon codes. However, the discount codes may be invalid or expired. Accordingly, the user may not be able to find offers or discount codes that the user can utilize. As a result, the user may lose commitment to purchasing products or services from the website.

Furthermore, even if the third-party websites provide valid and unexpired discount codes, the third-party websites may provide discount codes in ways that are not consistent with the website's branding, messaging, and/or style. Accordingly, the loyalty of the user to the website, the entity operating the website, and/or the entity's brands may decrease, which may result in reduced sales for the website and/or reduced brand value.

Moreover, even if the website provides offers to the user and the user is able to access those offers, the website may not provide any personalized encouragement to the user to help the user obtain the offers. For example, an offer may only become valid if the user selects a threshold value of products or services for purchase. If the user has selected products or services for purchase, the user may not be aware of the value of additional products or services the user needs to select for purchase in order to meet the threshold value and qualify for the offer. As another example, the offer may expire before the user obtains the offer.

Additionally, the website may provide the same offers to all users of the website, and thus not personalize offers to users.

SUMMARY

In some aspects, the techniques described herein relate to a non-transitory computer-readable medium including executable instructions, the executable instructions being executable by one or more processors to perform a method, the method including: detecting, using a first user interaction tracking module associated with a first website, first access of a first user of a first webpage that is part of the first website, the first website providing multiple first products for sale and operated by a first entity, the first user interaction tracking module provided by an offer aggregator entity, the offer aggregator entity distinct from the first entity, the first website having a first theme providing a first look and feel for the first website; accessing a first profile of the first user; identifying, based on the first profile of the first user, multiple first offers to provide to the first user, each first offer of the multiple first offers defined by the first entity and having offer attributes including a first offer title and a first reference to one or more first products of the multiple first products, at least one first offer of the multiple first offers having an expiration date and time and further including a countdown, the countdown indicating the expiration date and time or an amount of time before the expiration date and time; providing for display to the first user in the first webpage the multiple first offers, each first offer for display including the first offer title and the first reference to the one or more first products, the at least one first offer further including the countdown, each first offer having the first theme; detecting, using a second user interaction tracking module associated with a second website, second access of a second user of a second webpage that is part of the second website, the second website providing multiple second products for sale and operated by a second entity, the second user interaction tracking module provided by the offer aggregator entity, the offer aggregator entity distinct from the second entity, the second website having a second theme providing a second look and feel for the second website, the second theme different from the first theme; accessing a second profile of the second user; identifying, based on the second profile of the second user, multiple second offers to provide to the second user, each second offer of the multiple second offers defined by the second entity and having offer attributes including a second offer title and a second reference to one or more second products of the multiple second products, at least one second offer of the multiple second offers further including a discount code, a threshold value of second products to be selected for purchase to be met to qualify for the discount code, and a progress indicator, the progress indicator indicating a progress of the second user in qualifying for the discount code; and providing for display to the second user in the second webpage the multiple second offers, each second offer for display including the second offer title and the second reference to the one or more second products, the at least one second offer further including the progress indicator, each second offer having the second theme.

In some aspects, the techniques described herein relate to a non-transitory computer-readable medium, the method further including: determining that the second user has selected one or more second products of the multiple second products for purchase; updating the progress indicator to obtain an updated progress indicator, the updated progress indicator indicating the progress of the second user in qualifying for the discount code; and providing for display the updated progress indicator in the at least one second offer.

In some aspects, the techniques described herein relate to a non-transitory computer-readable medium, the method further including: receiving the first theme for the multiple first offers; associating the first theme with the multiple first offers; receiving the second theme for the multiple second offers; and associating the second theme with the multiple second offers.

In some aspects, the techniques described herein relate to a non-transitory computer-readable medium, the method further including: providing for display a user interface having a user interface element for receiving an address of a website; receiving a first address of the first website in the user interface element of the user interface; receiving a first request to obtain the first theme from the first website using the first address; receiving a second address of the second website in the user interface element of the user interface; and receiving a second request to obtain the second theme from the second website using the second address; wherein receiving the first theme for the multiple first offers includes obtaining, using the first address, the first theme from the first website, and wherein receiving the second theme for the multiple second offers includes obtaining, using the second address, the second theme from the second website.

In some aspects, the techniques described herein relate to a non-transitory computer-readable medium, the method further including identifying one or more first rules associated with the multiple first offers, at least one first rule of the one or more first rules including at least one first condition, and wherein identifying, based on the first profile of the first user, the multiple first offers to provide to the first user includes determining that the at least one first condition of the at least one first rule is met.

In some aspects, the techniques described herein relate to a non-transitory computer-readable medium, the method further including identifying one or more priorities associated with the multiple first offers, and wherein providing for display to the first user the multiple first offers includes providing for display to the first user the multiple first offers in an order based on the one or more priorities associated with the multiple first offers.

In some aspects, the techniques described herein relate to a non-transitory computer-readable medium wherein the at least one first offer further includes at least one of a discount code for the one or more first products and a link to the one or more first products.

In some aspects, the techniques described herein relate to a non-transitory computer-readable medium, further including generating the multiple first offers for display to the first user, wherein generating the multiple first offers for display to the first user occurs at substantially a same time as detecting, using the first user interaction tracking module associated with the first website providing multiple first products for sale, the first access of the first user of the first webpage that is part of the first website occurs at a first time.

In some aspects, the techniques described herein relate to a method including: detecting, using a first user interaction tracking module associated with a first website, first access of a first user of a first webpage that is part of the first website, the first website providing multiple first products for sale and operated by a first entity, the first user interaction tracking module provided by an offer aggregator entity, the offer aggregator entity distinct from the first entity, the first website having a first theme providing a first look and feel for the first website; accessing a first profile of the first user; identifying, based on the first profile of the first user, multiple first offers to provide to the first user, each first offer of the multiple first offers defined by the first entity and having offer attributes including a first offer title and a first reference to one or more first products of the multiple first products; providing for display to the first user in the first webpage the multiple first offers, each first offer for display including the first offer title and the first reference and having the first theme; detecting, using a second user interaction tracking module associated with a second website, second access of a second user of a second webpage that is part of the second website, the second website providing multiple second products for sale and operated by a second entity, the second user interaction tracking module provided by the offer aggregator entity, the offer aggregator entity distinct from the second entity, the second website having a second theme providing a second look and feel for the second website, the second theme different from the first theme; accessing a second profile of the second user; identifying, based on the second profile of the second user, multiple second offers to provide to the second user, each second offer of the multiple second offers defined by the second entity and having offer attributes including a second offer title and a second reference to one or more second products of the multiple second products; and providing for display to the second user in the second webpage the multiple second offers, each second offer for display including the second offer title and the second reference and having the second theme.

In some aspects, the techniques described herein relate to a method wherein at least one first offer of the multiple first offers further includes a discount code for the one or more first products, and the at least one first offer includes a selectable user interface element that when selected causes the discount code to be displayed in a pop-up window, and the method further includes: providing for display the selectable user interface element in the at least one first offer; receiving a selection of the selectable user interface element; and providing for display in a pop-up window the discount code.

In some aspects, the techniques described herein relate to a method wherein the selectable user interface element is a first selectable user interface element, the pop-up window includes a second selectable user interface element that when selected causes the discount code to be copied and a product webpage for the one or more first products to be accessed, and the method further includes: providing for display in the pop-up window the second selectable user interface element; receiving a selection of the second selectable user interface element; and causing the discount code to be copied and the product webpage for the one or more first products to be accessed.

In some aspects, the techniques described herein relate to a method wherein at least one first offer of the multiple first offers has an expiration date and time and further includes a countdown, the countdown indicating the expiration date and time or an amount of time before the expiration date and time, and the at least one first offer further includes the countdown.

In some aspects, the techniques described herein relate to a method wherein at least one first offer of the multiple first offers further includes a discount code, a threshold value of first products to be selected for purchase to be met to qualify for the discount code, and a progress indicator, the progress indicator indicating a progress of the first user in qualifying for the discount code, and the at least one first offer further includes the progress indicator.

In some aspects, the techniques described herein relate to a method, further including: determining that the first user has selected one or more first products of the multiple first products for purchase; updating the progress indicator to obtain an updated progress indicator, the updated progress indicator indicating the progress of the first user in qualifying for the discount code; and providing for display the updated progress indicator in the at least one first offer.

In some aspects, the techniques described herein relate to a method further including: receiving the first theme for the multiple first offers; associating the first theme with the multiple first offers; receiving the second theme for the multiple second offers; and associating the second theme with the multiple second offers.

In some aspects, the techniques described herein relate to a method further including: providing for display a user interface having a user interface element for receiving an address of a website; receiving a first address of the first website in the user interface element of the user interface; receiving a first request to obtain the first theme from the first website using the first address; receiving a second address of the second website in the user interface element of the user interface; and receiving a second request to obtain the second theme from the second website using the second address; wherein receiving the first theme for the multiple first offers includes obtaining, using the first address, the first theme from the first website, and wherein receiving the second theme for the multiple second offers includes obtaining, using the second address, the second theme from the second website.

In some aspects, the techniques described herein relate to a method, further including identifying one or more first rules associated with the multiple first offers, at least one first rule of the one or more first rules including at least one first condition, and wherein identifying, based on the first profile of the first user, the multiple first offers to provide to the first user includes determining that the at least one first condition of the at least one first rule is met.

In some aspects, the techniques described herein relate to a method, further including identifying one or more priorities associated with the multiple first offers, and wherein providing for display to the first user the multiple first offers includes providing for display to the first user the multiple first offers in an order based on the one or more priorities associated with the multiple first offers.

In some aspects, the techniques described herein relate to a method, further including identifying, based on the first profile of the first user, one or more recommended first products of the multiple first products, and wherein at least one first offer of the multiple first offers further includes the one or more recommended first products, and the at least one first offer further includes the one or more recommended first products.

In some aspects, the techniques described herein relate to a system including at least one processor and memory containing executable instructions, the executable instructions being executable by the at least one processor to: detect, using a first user interaction tracking module associated with a first website, first access of a first user of a first webpage that is part of the first website, the first website providing multiple first products for sale and operated by a first entity, the first user interaction tracking module provided by an offer aggregator entity, the offer aggregator entity distinct from the first entity, the first website having a first theme providing a first look and feel for the first website; access a first profile of the first user; identify, based on the first profile of the first user, multiple first offers to provide to the first user, each first offer of the multiple first offers defined by the first entity and having offer attributes including a first offer title and a first reference to one or more first products of the multiple first products; provide for display to the first user in the first webpage the multiple first offers, each first offer for display including the first offer title and the first reference and having the first theme; detect, using a second user interaction tracking module associated with a second website, second access of a second user of a second webpage that is part of the second website, the second website providing multiple second products for sale and operated by a second entity, the second user interaction tracking module provided by the offer aggregator entity, the offer aggregator entity distinct from the second entity, the second website having a second theme providing a second look and feel for the second website, the second theme different from the first theme; access a second profile of the second user; identify, based on the second profile of the second user, multiple second offers to provide to the second user, each second offer of the multiple second offers defined by the second entity and having offer attributes including a second offer title and a second reference to one or more second products of the multiple second products; and provide for display to the second user in the second webpage the multiple second offers, each second offer for display including the second offer title and the second reference and having the second theme.

BRIEF DESCRIPTION OF THE DRAWINGS

FIGS. 3B-3D depict example user interfaces for personalized offers and information in some embodiments.

FIGS. 5B and 5C depict an example user interface for receiving a theme for personalized offers and information in some embodiments.

Throughout the drawings, like reference numerals will be understood to refer to like parts, components, and structures.

DETAILED DESCRIPTION

Figure 1:
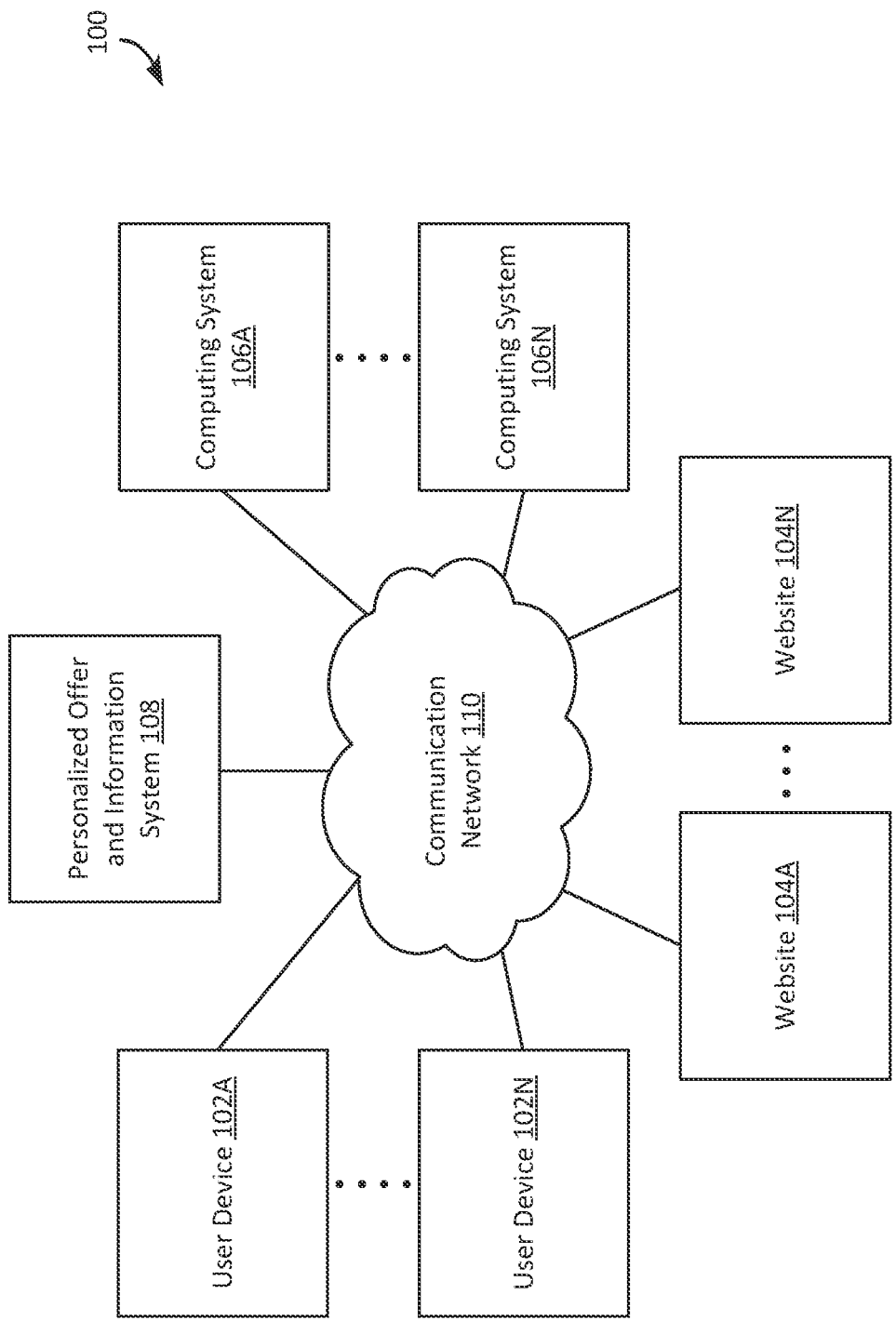
FIG. 1 is a block diagram depicting an example environment in which a personalized offer and information system may operate in some embodiments.

The personalized offer and information system described herein may be integrated with websites so as to provide users of the websites with personalized offers and contextual information, such as product recommendations. Entities operating websites may define offers and conditions to be met for the offers to become available to users. The personalized offer and information system may detect interactions of a user with a website and use such interactions to create and/or update a user profile. The personalized offer and information system may utilize the user profile and the conditions of the offers to identify personalized offers and information for the user. The personalized offer and information system may provide the personalized offers and information for display to the user on a webpage dedicated to containing personalized offers and contextual information. Such a dedicated webpage may be referred to as a "deals page" or as a "offers page."

As the user accesses other webpages on the website, the personalized offer and information system may detect user interactions with the website, such as products or services the user views and/or selects for purchase. The personalized offer and information system may update the user profile based on the detected user interactions. The personalized offer and information system may update the webpage dedicated to containing personalized offers and contextual information based on the updated user profile, so that the webpage continues to contain personalized offers and contextual information that are likely to be of interest to the user.

An offer may include a countdown that indicates for how much longer the offer is available and/or a progress bar that indicates an amount of progress the user has made towards qualifying for the offer and an amount of progress the user still has to make to qualify for the offer. For example, the countdown may indicate that an offer may expire in a period of 24 hours from the time the user first viewed the offer. As another example, an offer may provide free shipping or a discount code if the user purchases or selects for purchase products or services whose value exceeds a threshold amount. The progress bar may indicate to the user the progress the user has made and the progress the user still has to make to qualify for the offer based on the value of the products or services the user has selected for purchase.

The personalized offer and information system described herein may provide numerous advantages. First, by basing the offers and information on the interactions of the user with the retailer website, the personalized offer and information system provides offers and information that are likely more relevant and meaningful to the user. Second, by providing personalized offers and information to the user, the personalized offer and information system may increase the likelihood of the user purchasing a product or service from the website and may increase engagement of the user with the website. Accordingly, the conversion rate of the website may increase and the loyalty of the user to the website, the entity operating the website, and/or the entity's brands may also increase. Third, by providing countdowns and progress bars to the user, the personalized offers and information system may encourage or incentivize the user to take actions to redeem the offer and/or qualify for the offer. Such encouragement may result in the user purchasing more products or services than the user would purchase without the encouragement. Accordingly, the personalized offer and information system may increase the average order value (AOV) of the website.

The personalized offer and information system may persist the personalized offers and information to the user regardless of whether the user is signed in or not and across visits by the user to the website that are spaced apart in time. Such persistence of the personalized offers and information may help build loyalty of the user to the website, the entity operating the website, and/or the entity's brands, and increase the likelihood of the user purchasing products or services from the website in the future.

The personalized offer and information system allows for numerous entities to provide personalized offers and information on the websites they operate in a scalable and computationally efficient manner. Entities that may not have the computational or business resources to provide their own personalization systems may utilize the personalized offer and information system to quickly and easily set up webpages containing personalized offers and information for the users of their websites. Accordingly, the personalized offer and information system solves scalability issues for numerous entities. The personalized offer and information system thereby improves technologies relating to providing personalized offers and information to users.

Although many examples herein describe the personalized offers and information system providing personalized offers and information to a single user at a single website, the personalized offers and information system is scalable to numerous users at a single website and to numerous websites. In other words, the personalized offers and information system may provide personalized offers and information to any number of users at any number of websites. The scalability of the personalized offers and information is due, in part, to the architecture of the personalized offers and information system. The architecture of the personalized offers and information system allows the personalized offers and information system to, in real-time or near real-time, detect user interactions, create and/or update user profiles, and provide personalized offers and information to numerous users, all in a low-latency or near low-latency fashion. Accordingly, the personalized offers and information system is scalable to meet the demands of numerous entities to provide personalized offers and information to the users of the entities' websites.

FIG. 1 depicts an example environment 100 in which personalized offers and information may be provided in some embodiments. The example environment 100 includes multiple user devices 102A through 102N (referred to as a user device 102 or as user devices 102), multiple websites 104A through 104N (referred to as a website 104 or as websites 104), multiple computing systems 106A through 106N (referred to as a computing system 106 or as computing systems 106), a personalized offer and information system 108, and a communication network 110. Each of the user device 102, the website 104, the computing system 106, and the personalized offer and information system 108 may be or include any number of digital devices. A digital device is any device with at least one processor and memory. Digital devices are discussed further herein, for example, with reference to FIG. 9.

An entity, such as a natural person, a retailer, a wholesaler, a distributor, a manufacturer or any other entity, may operate the website 104. The website 104 may provide products, services, or software for sale, lease or license. A user may use a user device 102 to access the website 104 in order to view products, services or software, select products, services or software for purchase, lease, or license, and/or purchase, lease, or license products, services or software. An offer aggregator entity that is distinct from the first entity may operate the personalized offer and information system 108. The offer aggregator entity may provide personalized offers and information to multiple websites operated by multiple entities.

The personalized offer and information system 108 may provide personalized offers and information to a webpage dedicated to personalized offers and information on the website 104 for display to the user on the user device 102. The entity may operate the computing system 106 to perform various functions, including configuring the website 104 and sending requests and/or data to and receiving requests and/or data from the personalized offer and information system 108. For example, the entity may utilize the computing system 106 to define campaigns, offers, and rules that the personalized offer and information system 108 uses to provide personalized offers to the dedicated webpage on the website 104 for display to the user on the user device 102.

In some embodiments, the communication network 110 may represent one or more computer networks (for example, LAN, WAN, and/or the like). The communication network 110 may provide communication between any of the user device 102, the website 104, the computing system 106, and the personalized offer and information system 108. In some implementations, the communication network 110 comprises computer devices, routers, cables, and/or other network topologies. In some embodiments, the communication network 110 may be wired and/or wireless. In various embodiments, the communication network 110 may comprise the Internet, one or more networks that may be public, private, IP-based, non-IP based, and so forth.

Figure 2:
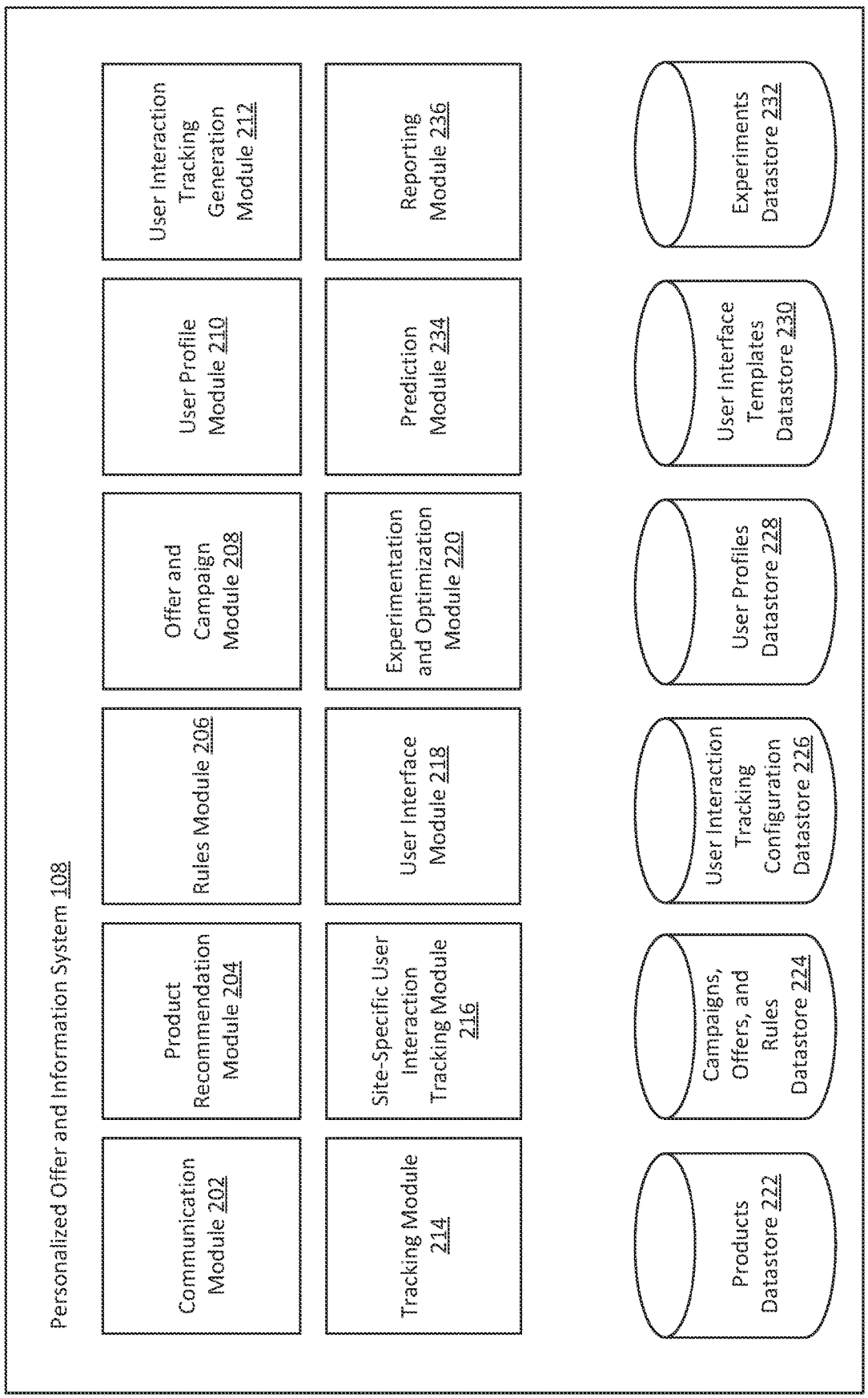
FIG. 2 is a block diagram depicting components of a personalized offer and information system in some embodiments.

FIG. 2 depicts components of the personalized offer and information system 108 in some embodiments. The personalized offer and information system 108 may include a communication module 202, a product recommendation module 204, a rules module 206, an offer and campaign module 208, and a user profile module 210. The personalized offer and information system 108 may also include a user interaction tracking generation module 212, a tracking module 214, a site-specific user interaction tracking module 216, a user interface module 218, and an experimentation and optimization module 220. The personalized offer and information system 108 may also include a prediction module 234 and a reporting module 236. The personalized offer and information system 108 may also include a products datastore 222, a campaigns, offers, and rules datastore 224, a user interaction tracking configuration datastore 226, a user profiles datastore 228, a user interface templates datastore 230, and an experiments datastore 232.

The communication module 202 may send and/or receive requests and/or data between the personalized offer and information system 108 and any of the user device 102, the website 104, and the computing system 106. The communication module 202 may receive requests and/or data from any of the user device 102, the website 104, and the computing system 106. The communication module 202 may also send requests and/or data to any of the user device 102, the website 104, and the computing system 106.

The product recommendation module 204 may provide product recommendations. The product recommendation module 204 may receive product recommendation requests with parameters. The product recommendation module 204 may weight product recommendations with a given bias using the parameters. For example, the product recommendation module 204 may weight product recommendations towards products or services the user has selected for purchase, products or services that are frequently purchased together, and the best-selling products or services. The product recommendation module 204 may also use the parameters to provide category and brand restrictions and modifiers.

The rules module 206 may receive rule attributes from users and generate rules based on the rule attributes. The rules module 206 may also evaluate offers and a user profile to determine whether to display an offer to the user. The rules module 206 may optionally provide a relevance score based on the evaluation. The offer and campaign module 208 may receive offer attributes from users and generate offers based on the offer attributes. The offer and campaign module 208 may also receive campaign attributes and generate campaigns based on the campaign attributes. The offer and campaign module 208 may provide campaigns and the offers to users of a website 104.

The user profile module 210 may access a user profile to obtain information about a particular user. If the user profile does not exist, the user profile module 210 may create the user profile. The user profile module 210 may update a user profile to include page access by and/or user interaction with a user with a website 104. The user profile module 210 may include data such as the current and historic shopping cart data, which is data on the products or services the user has selected for purchase either currently or historically and data such as current and historic sale data, which is data on the products or services the user has purchased currently or historically, in the user profile. The user profile may also include data such as current and historic landing pages of the user, current and historic segment records of the user, location of the user, weather at the location of the user, and prediction or predilection scores. The user profile module 210 may also compute or estimate a prediction or predilection score for the user that estimates a likelihood or a propensity of the user to purchase a product or service.

The user interaction tracking generation module 212 may generate multiple site-specific user interaction tracking modules 216 for multiple websites 104, one site-specific user interaction tracking module 216 for each website 104. The tracking module 214 may receive user interactions from the site-specific user interaction tracking module 216 and provide user interactions to the user profile module 210 for creating and/or updating user profiles. The site-specific user interaction tracking module 216 may detect user interactions with the website 104 and provide such user interactions to the tracking module 214. The site-specific user interaction tracking module 216 may also control the website 104 so as to display a user interface element containing personalized offers and information and to hide the user interface element. The site-specific user interaction tracking module 216 may also control the website 104 so as to display a visual indication of offers and to hide the visual indication of offers. The site-specific user interaction tracking module 216 may also detect offers that the user has interacted with.

The user interface module 218 may display or provide for display user interface elements. The user interface module 218 may use templates, stylesheets (for example, dynamic stylesheets), code (for example, NodeJS server-side code), and custom field definitions to create and/or configure various user interface elements.

The experimentation and optimization module 220 may, given a set of variations and an optimization model, attempt to identify winning variations and automatically weight winning variations. The experimentation and optimization module 220 may also do split tests with no automating winner selection. The experimentation and optimization module 220 may automatically optimize various types of data, such as sets of offers, and content within offers, such as images, titles, subtitles, and/or layouts of offer components.

The prediction module 234 may generate and/or determine predictions based on machine learning and/or artificial intelligence (AI) models. In various embodiments, the prediction module 234 may utilize data from the various datastores of the personalized offer and information system 108, such as the user profiles datastore 228, to generate models and make predictions. For example, the prediction module 234 may utilize a random forest machine learning algorithm to train a set of decision trees. The prediction module 234 may provide a user profile to the set of trained decision trees to generate various predictions related to a propensity or predilection to purchase of a user.

The reporting module 236 may generate and provide reports, notifications, and/or dashboards that include campaign performance and offer performance as well as other information.

The products datastore 222 may include products data stored, accessed, and/or modified by the product recommendation module 204 or any of the other modules of the personalized offer and information system 108. In some embodiments, the products datastore 222 may be or include a graph database. The campaigns, offers, and rules datastore 224 may include campaigns, offers, and rules data stored, accessed, and/or modified by the offer and campaign module 208 or any of the other modules of the personalized offer and information system 108. The user interaction tracking configuration datastore 226 may include user interaction configuration data stored, accessed, and/or modified by the tracking module 214 or any of the other modules of the personalized offer and information system 108.

The user profiles datastore 228 may include user profile data stored, accessed, and/or modified by the user profile module 210 or any of the other modules of the personalized offer and information system 108. The user interface templates datastore 230 may include user interface templates data stored, accessed, and/or modified by the user interface module 218 or any of the other modules of the personalized offer and information system 108. The experiments datastore 232 may include experiments data stored, accessed, and/or modified by the experimentation and optimization module 220 or any of the other modules of the personalized offer and information system 108.

Each of the products datastore 222, the campaigns, offers, and rules datastore 224, the user interaction tracking configuration datastore 226, the user profiles datastore 228, the user interface templates datastore 230, and the experiments datastore 232 may include any number of data storage structures such as tables, databases, lists, and/or the like.

A module may be hardware, software, firmware, or any combination. For example, each module may include functions performed by dedicated hardware (for example, an Application-Specific Integrated Circuit (ASIC), a Field Programmable Gate Array (FPGA), or the like), software, instructions maintained in ROM, and/or any combination. Software may be executed by one or more processors.

Although a limited number of modules are depicted in FIG. 2, there may be any number of modules. Further, individual modules may perform any number of functions, including functions of multiple modules as described herein.

Figure 3A:
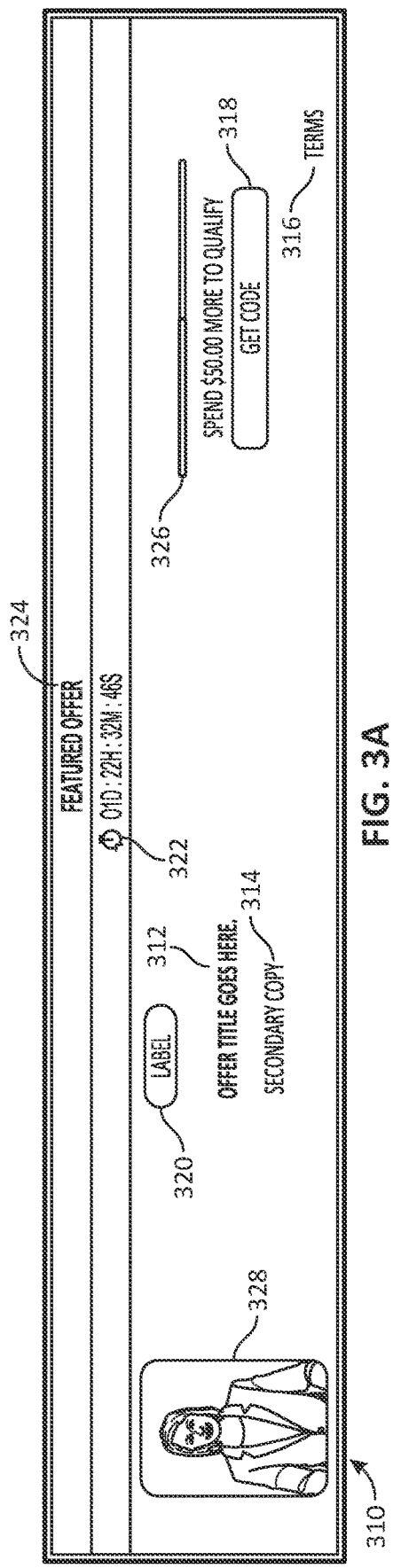
FIG. 3A depicts an example offer in some embodiments.

FIG. 3A depicts an example offer 310 in some embodiments. The offer 310 includes various attributes of the offer, including an offer title 312, an offer subtitle 314, a terms and conditions link 316, and a button 318 providing a call-to-action ("Get Code"). The offer 310 further includes a label 320, a countdown 322, and a highlight 324. The highlight 324 may indicate that the offer 310 is a featured offer. As discussed further herein with reference to, for example, FIG. 3C, the countdown 322 may visually indicate an amount of time remaining until the offer expires. The user interface module 218 may update the countdown 322. The offer 310 may also include a progress bar 326. Also as discussed further herein with reference to, for example, FIG. 3C, the progress bar 326 may visually indicate an amount, in a local currency of a user, of items the user has to select for purchase in order to obtain a discount code. The offer 310 also includes an image 328. In various embodiments, the offer 310 may include a video instead of or in addition to the image 328. Certain of the offer attributes in the offer 310 may be optional.

The personalized offer and information system 108 may provide user interfaces that allow users associated with entities that operate websites to define offers by providing offer attributes such as the offer title, the offer subtitle, the offer image, and/or offer enhancements such as a countdown or a progress bar. Co-pending application U.S. Provisional patent application Ser. No. 63/472,219, entitled "SYSTEMS AND METHODS FOR GENERATING OFFERS, CAMPAIGNS, AND RULES FOR INTEGRATION WITH WEBSITES," provides additional details as to how users may define offers, rules for offers, and campaigns.

FIGS. 3B-D depict example personalized offers and information in some embodiments. FIG. 3B depicts an example weblink offer 330. The weblink offer 330 includes a video 332, a label 334, an offer title 336, an offer subtitle 338, and a button 340 providing a call to action ("Shop Now") for the user. In various embodiments, the weblink offer 330 may include one or more images, graphics, animations, and/or the like (e.g., as an addition to or as an alternative to the video 332).

FIG. 3C depicts an example discount code offer 350. The discount code offer 350 includes an image 352 of a product, a label 354, an offer title 356, an offer subtitle 358, a countdown 360, a progress bar 362, a set of product recommendations 364, a button 366 to obtain the discount code providing a call-to-action ("Get Code") for the user, and a terms and conditions link 368. As discussed further herein, for example, with reference to FIGS. 4A and 4B, a discount code offer may have one or more rules associated with it that include conditions that have to be met in order for the user to obtain the discount code. The user interface module 218 may keep the button 366 inactive until the conditions are met and activate the button 366 after the conditions are met. For example, the discount offer shown in FIG. 3C has the condition that the user has to spend $80 to obtain 10% off the user's order and free shipping. Until that condition is met, the button 366 may be inactive. The progress bar 362, which may also be referred to as a progress visual indicator, may display the progress of the user in meeting the conditions. The countdown 360 may display a countdown timer indicating how much longer the discount code offer may be valid. The countdown 360 and the progress bar 362 may, alone or together, encourage the user to select products or services for purchase in order to obtain the discount code, which may further incentivize the user to select for purchase products or services.

FIG. 3D depicts an example product recommendations offer 370. The product recommendations offer 370 includes an offer title 372, an offer subtitle 374, a group of recommended products 376, and a button 378 to view all recommended products providing a call to action ("View All"). Each of the recommended products includes an image, a title, and a price. In some embodiments, the user may select a recommended product to view the page for the recommended product or add the selected product to a cart. As shown in FIG. 3C, a set of one or more product recommendations may also be included in a discount code offer. Although not shown in FIG. 3B, a link offer may similarly include a set of one or more product recommendations.

Figure 3E:
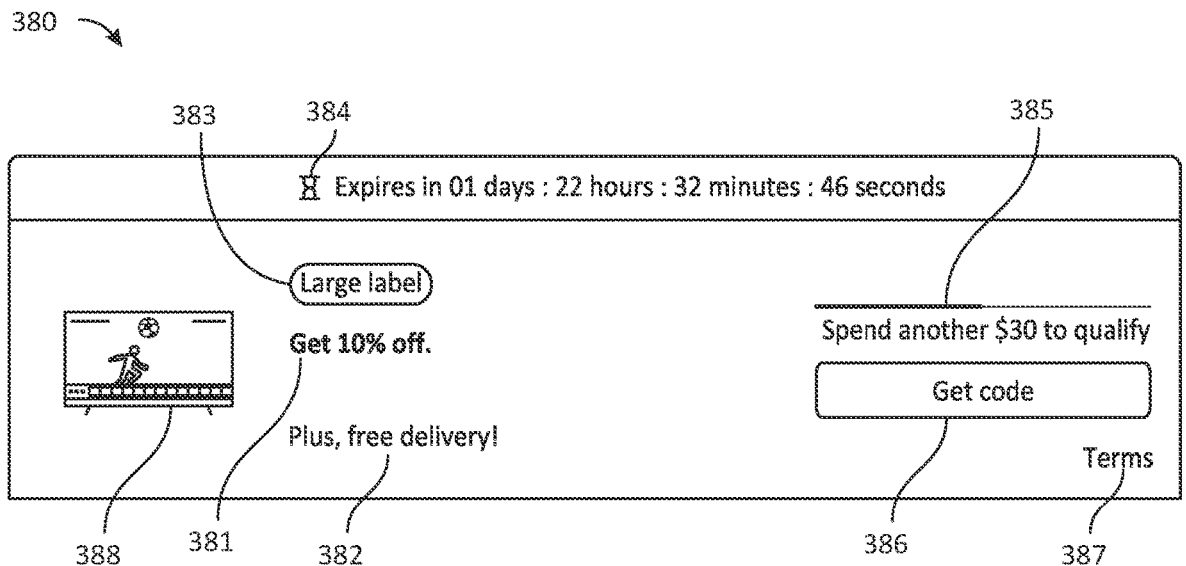
FIGS. 3E and 3F depict example offers in some embodiments.
Figure 3F:
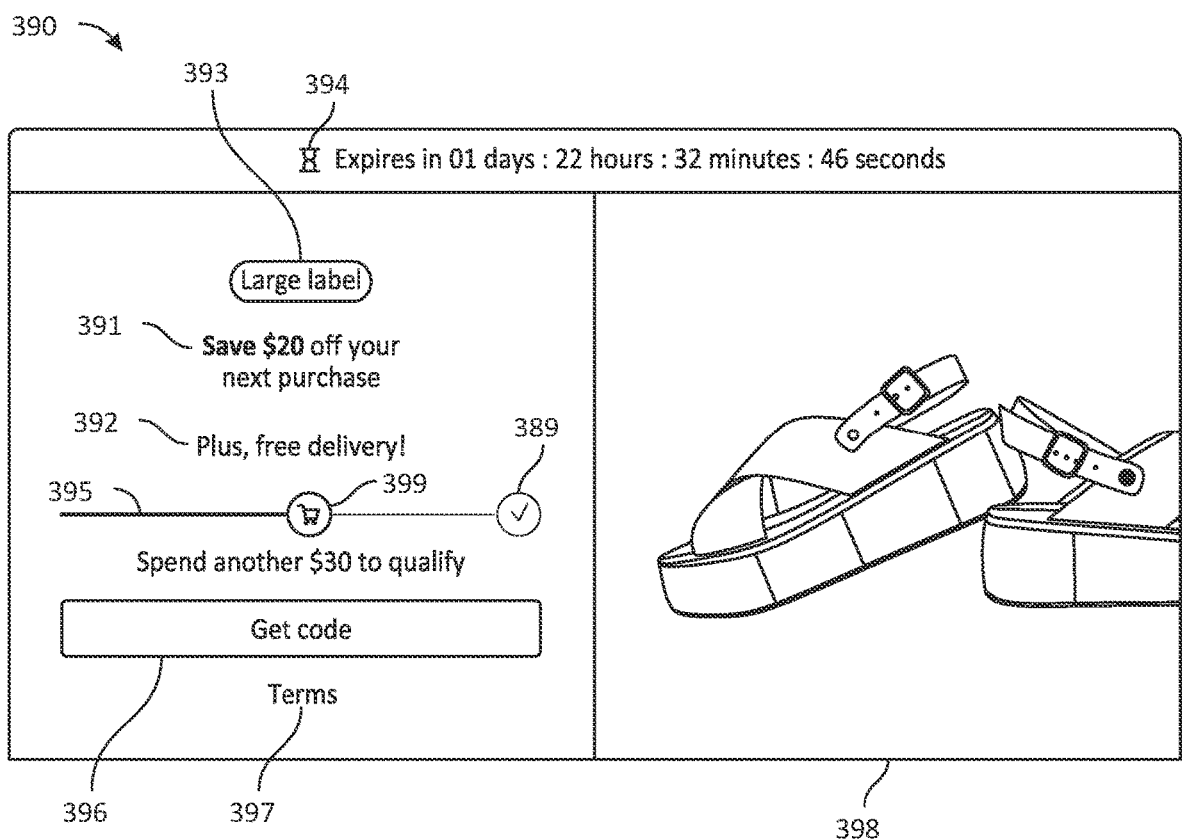

FIGS. 3E and 3F depict example offers in some embodiments. FIG. 3E depicts an example discount code offer 380. The discount code offer 380 includes an offer title 381, an offer subtitle 382, a terms and conditions link 387, and a button 386 providing a call to action ("Get Code"). The discount code offer 380 further includes a label 383, a countdown 384, a progress bar 385, and an image 388. The discount code offer 380 may have an expiration date and time. The countdown 384 may indicate the expiration date and time or an amount of time before the expiration date and time of the discount code offer 380.

FIG. 3F also depicts another example discount code offer 390. The discount code offer 390 includes an offer title 391, an offer subtitle 392, a terms and conditions link 397, and a button 396 providing a call-to-action ("Get Code"). The discount code offer 390 further includes a label 393, a countdown 394, a progress bar 395, and an image 398. The discount code offer 390 may have an expiration date and time. The countdown 394 may indicate the expiration date and time or an amount of time before the expiration date and time of the discount code offer 390. The progress bar 395 also includes a shopping cart icon 399 that visually indicates a progress of a user in qualifying for the discount code of the discount code offer. The progress bar 395 also includes a checkmark icon 389 that may change color or otherwise visually indicate to the user when the user has selected a sufficient amount of products for purchase to qualify for the discount code.

The discount code offer 380 of FIG. 3E may be considered a standard offer and the discount code offer 390 of FIG. 3F may be considered a featured offer. The user interface module 218 may display featured offers more prominently than standard offers, and/or featured offers may be larger than standard offers. Additionally or alternatively, featured offers may include user interface elements, such as the image, the call-to-action button, and/or other user interface elements, that are larger than corresponding user interface elements in standard offers.

Figure 4A:
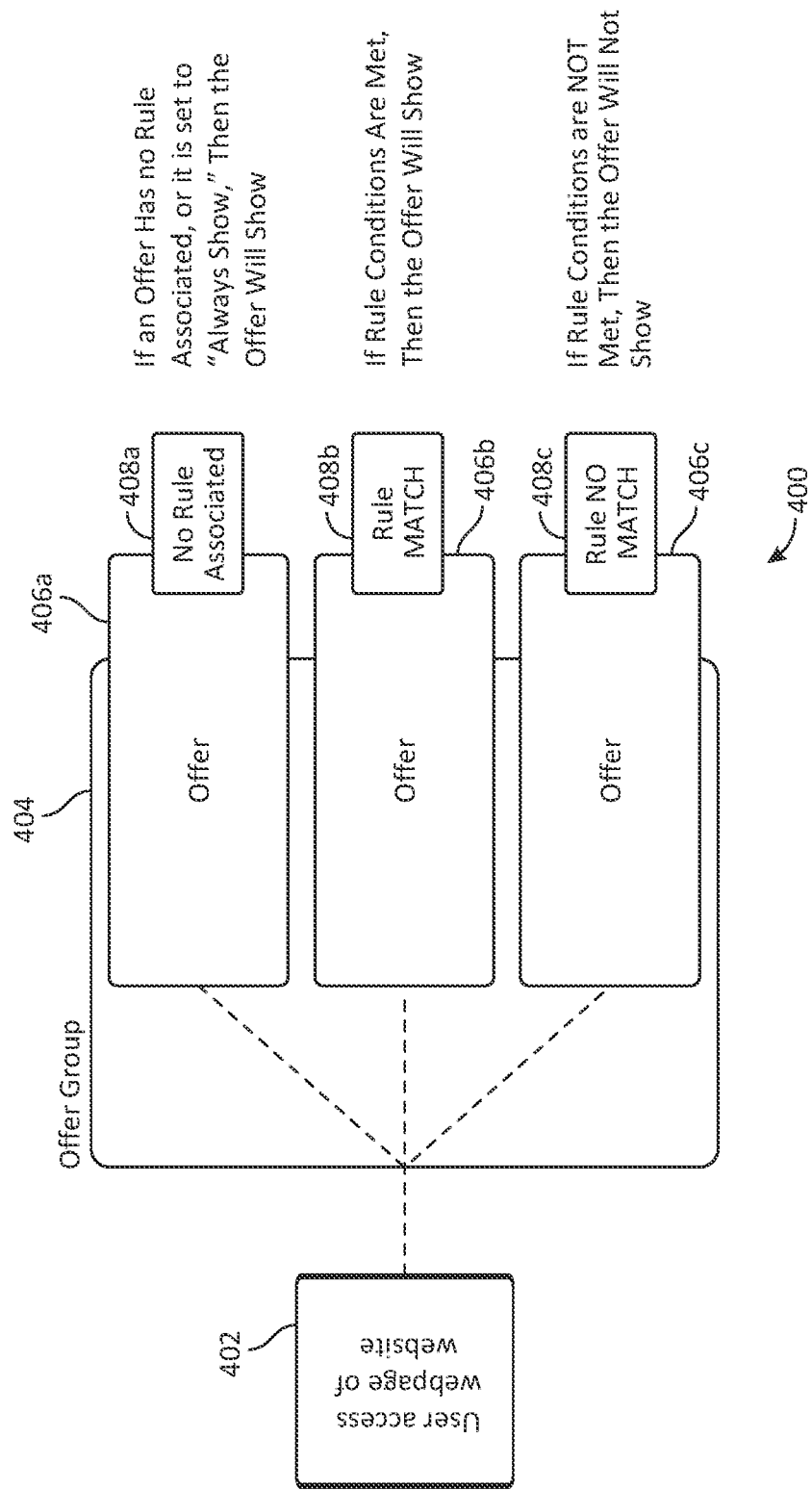
FIG. 4A is a block diagram depicting user access of a webpage, an offer group, offers, and rules in some embodiments.

FIG. 4A is a block diagram 400 depicting user access 402 of a webpage that provides personalized offers and information of a website. The offers 406 (shown individually as offers 406a-c) may be in an offer group 404. The offers 406 may have rules 408 (shown individually as rules 408a-c) associated with the offers 406 in some embodiments. The offer 406a has no associated rules, as indicated by 408a. Since the offer 406a has no associated rules, the offer 406a is valid to show. Offer 406b has the rule 408b associated with it. The rule 408b may have one or more associated conditions, and if the associated conditions are met, then the offer 406b will show. Offer 406c has the rule 408c associated with it. The rule 408c may have one or more associated conditions, and if the associated conditions are not met, then the offer 406c will not show. For example, if the offer has been configured to not show if the associated conditions are not met, then the offer 406c will not be shown.

In some embodiments, an offer 406 may be set to always be shown to users of a website 104. In such embodiments, the offer 406 will always be shown to the users, even if the offer 406 has rules 408 associated with the offer 406 with conditions that are not met.

An offer 406 may also be set to persist once the offer 406 has been displayed on the website 104. If so, then once the conditions of the associated rule 408 have been met and the offer 406 has been shown, then the offer 406 will continue to be displayed on the website 104 to the user. For example, if an offer 406 has a rule 408 with conditions specifying that the offer 406 is to be displayed if the value of the products or services in a shopping cart of the user is between a first amount (for example, $50) and a second amount (for example, $100), then the offer 406 will continue to be shown to the user even if the value dips below the first amount or rises above the second amount. If the offer is not set to persist once shown, then the offer will not display if the value dips below the first amount or rises above the second amount.

Figure 4B:
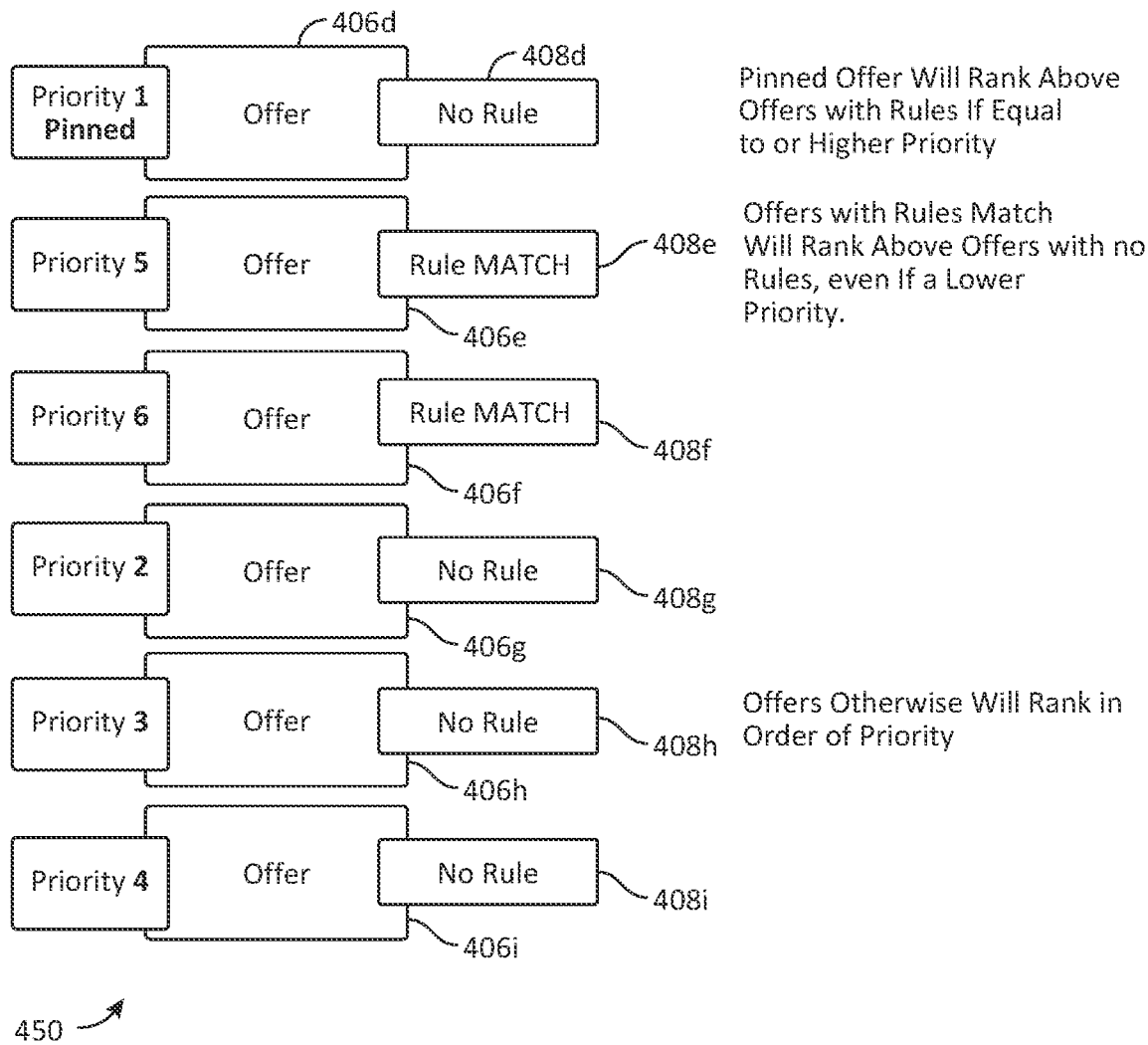
FIG. 4B is a block diagram depicting priorities of offers and rules in some embodiments.

An offer 406 may have a priority and/or be pinned. For example, an offer 406 may have a priority on a scale of 1-20, with 1 being the highest priority and 20 being the lowest priority. FIG. 4B is a block diagram 450 depicting priorities of offers in some embodiments. Offer 406d has a priority of one and is pinned but has no associated rules, as indicated by 408d. A pinned offer will rank above offers with rules if the pinned offer has a priority that is equal to or higher than the priorities of offers with rules. Accordingly, offer 406d will rank above offer 406e, which has a matching rule 408e, and offer 406f, which also has a matching rule 408f. Offers with associated rules whose conditions match will rank above offers with no associated rules even if they are lower priority. Accordingly, offer 406e and offer 406f will rank above offer 406g (which has no associated rule, as indicated by 408g), offer 406h (which has no associated rule, as indicated by 408h), and offer 406i (which has no associated rule, as indicated by 408i). Offers without rules, such as offer 406g, offer 406h, and offer 406i, will rank in order of priority. Accordingly offer 406g, which has a priority of 2, ranks above offer 406h, which has a priority of 3, and also above offer 406i, which has a priority of 4. The user interface module 218 uses the rank of offers to order the offers for display in the user interface element.

Figure 5A:
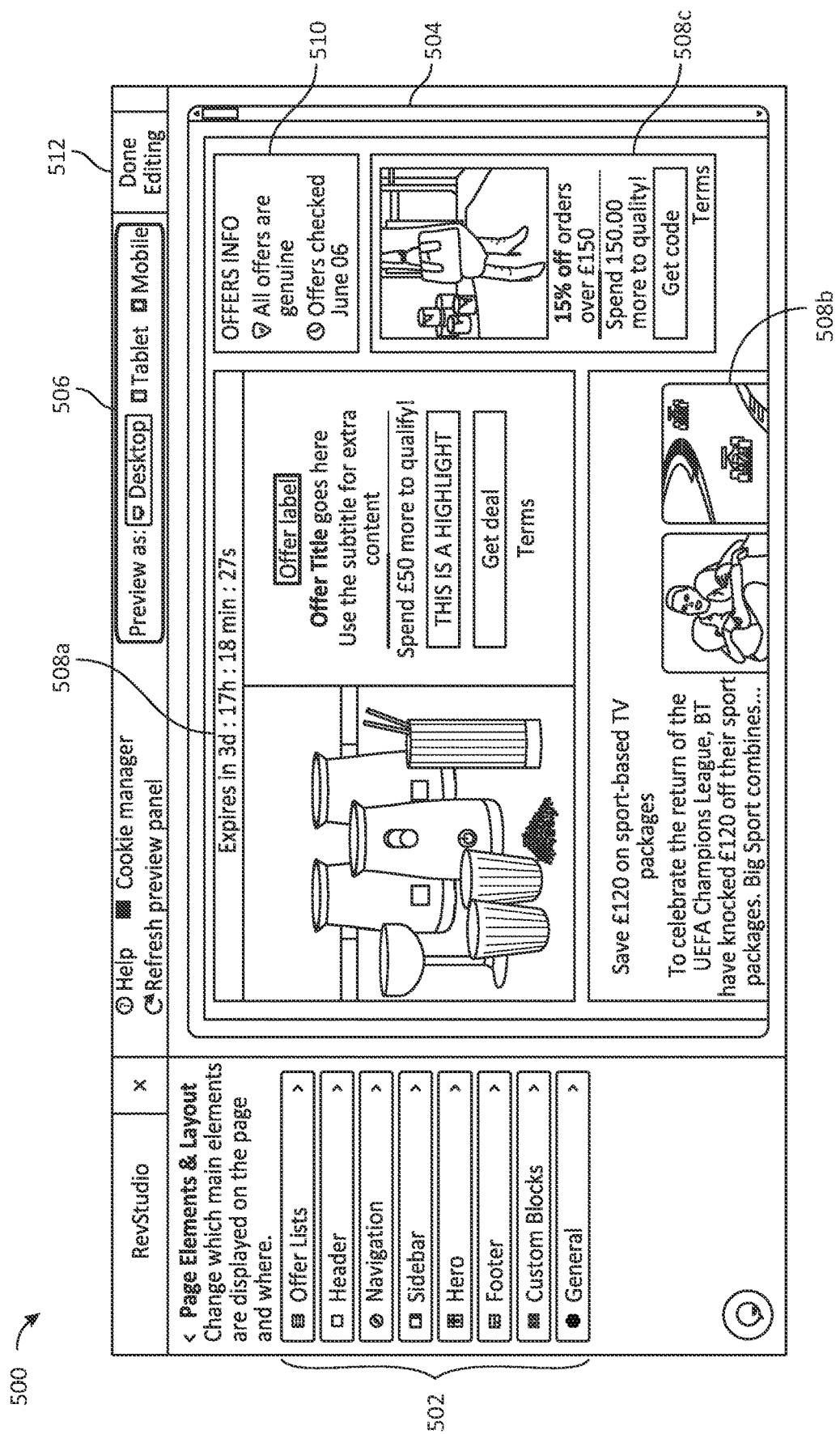
FIG. 5A depicts an example user interface for receiving a layout for personalized offers and information in some embodiments.

FIG. 5A depicts an example user interface 500 for receiving a layout for personalized offers and information in some embodiments. The user interface module 218 may provide the user interface 500 for display to a user associated with the entity that operates the website 104 for purposes of laying out offers in the webpage that provides personalized offers and information and/or customizing other aspects of the webpage in which the offers are displayed. The user interface 500 includes a navigation menu 502 and a user interface element 504 in which multiple offers 508 are displayed (shown individually as offer 508a, offer 508b, and offer 508c). The user interface element 504 also includes an information panel 510 indicating that all the offers 508 are genuine and the date on which the offers 508 were last checked. The user interface 500 also includes a user interface element 506 allowing the user to preview the offers 508 as they would appear on either a desktop, a tablet, or a mobile device, and a button 512 that can be selected when the user is done editing the layout of the offers and/or customizing other aspects of the webpage in which the offers are displayed.

One advantage of the information panel 510 is that allows the entity operating the website 104 to provide assurances to users of the website 104 that all the offers 508 are genuine, meaning that all the entity that operates the website 104 authorizes all of the offers 508, and that the offers 508 are current, meaning that they can be used without concern that the offers 508 have expired. Accordingly, disadvantages of prior art systems, which may provide offers with expired discount codes or discount codes that do not work, are overcome.

Figures 5B, 5C:
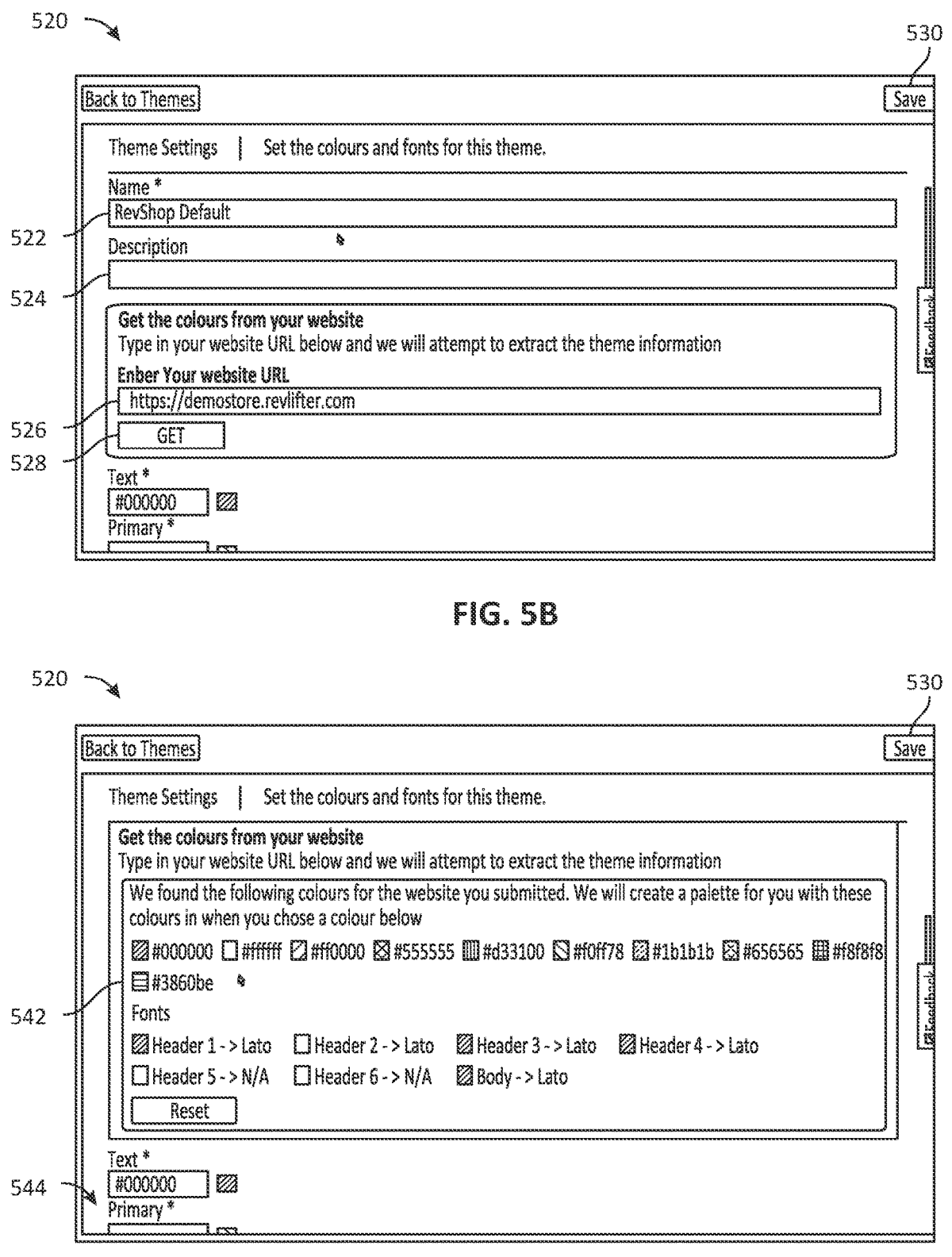

FIGS. 5B and 5C depict an example user interface 520 for receiving a theme for personalized offers and information in some embodiments. The user interface module 218 may provide the user interface 520 for display to a user. FIG. 5B depicts the example user interface 520 as including a user interface element 522 for receiving a theme name, a user interface element 524 for receiving a theme description, and a user interface element 526 for receiving an address of a website from which a theme is to be obtained. A user associated with an entity operating a website 104 may specify the theme name, the theme description, and the address of the website 104. The user may then select the button 528. The communication module 202 may access the website 104 using the address to obtain the theme of the website 104.

FIG. 5C depicts the user interface 520 including a user interface element 542 in which colors of the website 104 from which the theme was obtained are displayed. The user interface element 542 displays the colors for the website 104 as well as fonts for the website 104. The user interface 520 also includes multiple user interface elements 544 in which the user may specify colors of the text to be used for offers, colors of the text on primary portions of offers, colors of the text on secondary portions of offers, colors of the text on highlight portions of offers, and colors of the primary, secondary, and highlight portions of offers. The user may also specify other aspects of the theme to be used for offers, such as how corners of cards, buttons, and other elements should be displayed (rounded, squared, etc.), a primary font, a secondary font, and other aspects that define the theme that provides the look and feel of the offers. The user may save the theme by selecting a button 530 labeled "Save." Accordingly, the user interface 520 allows the user to specify a theme for personalized offers and information to be displayed on the website 104 that is the same as, or at least consistent with, the theme of the website 104.

Figure 6A:
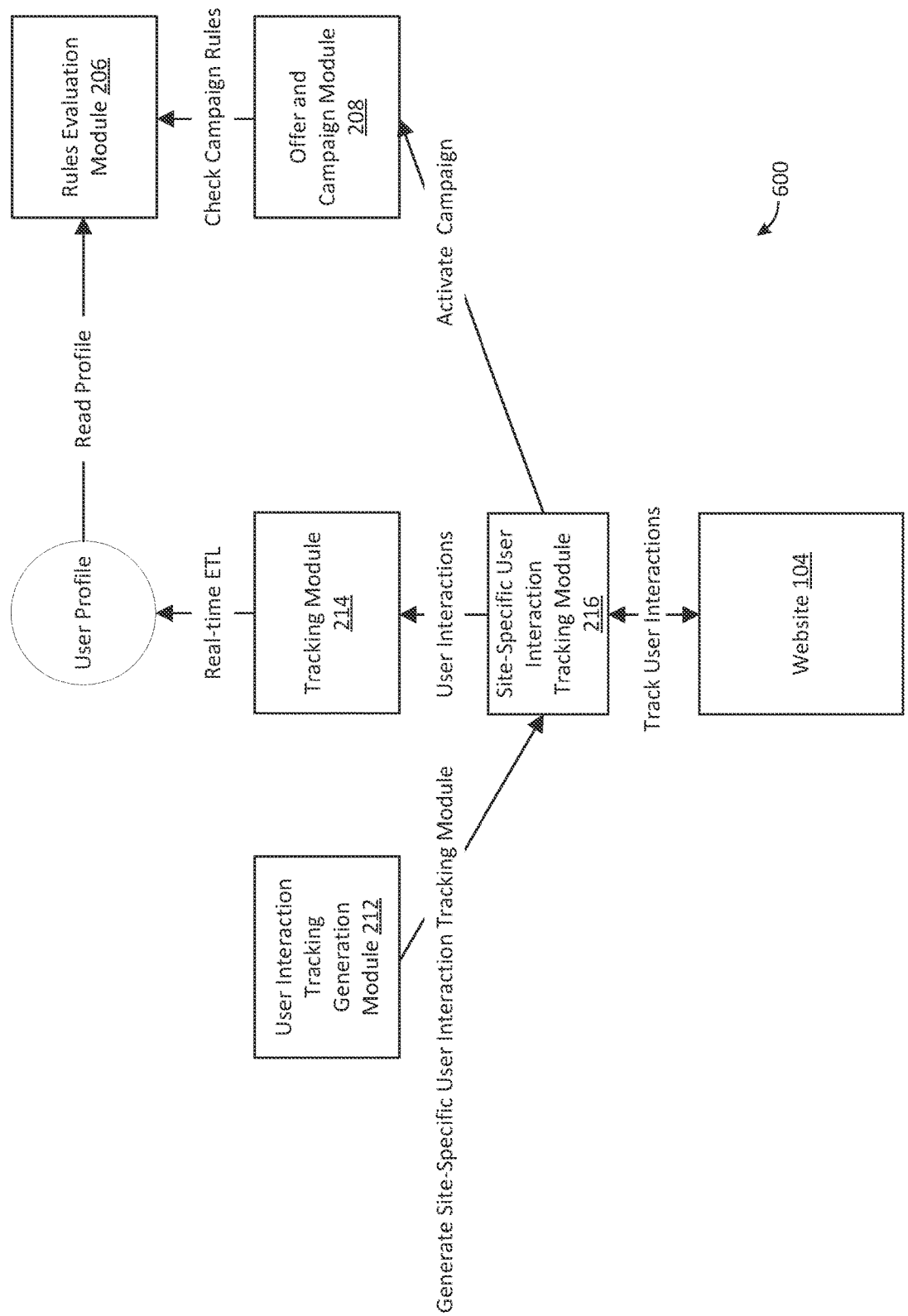
FIG. 6A is a block diagram depicting data flow between certain components of a personalized offer and information system and a website in some embodiments.

FIG. 6A is a block diagram 600 depicting data flow between certain components of the personalized offer and information system 108 and a website 104 that provides multiple products or services for sale in some embodiments. The user interaction tracking generation module 212 may generate the site-specific user interaction tracking module 216 and provide it to the computing system 106 for installation on the website 104. In some embodiments, the site-specific user interaction tracking module 216 may be provided by a third-party system (for example, a system of an affiliate network). In some embodiments, the site-specific user interaction tracking module 216 may be or include a tag. The tag may include code, such as client-side JavaScript code, that executes on a user device 102. In such embodiments, the computing system 106 may utilize a tag manager to install the tag or install the tag via a tag of a third-party system (for example, a system of an affiliate network) that is already installed on the website 104. Each website 104 may have a site-specific user interaction tracking module 216 that has its own unique identifier, such as a universally unique identifier (UUID).

The site-specific user interaction tracking module 216 may detect or track interactions of users with the website 104 and send them to the tracking module 214. For example, the site-specific user interaction tracking module 216 may collect existing JavaScript variables (for example, data layers) and send them to the tracking module 214. The tracking module 214 may transform the user interactions data so that the user interactions data conforms to a common data schema for user profiles. For example, the tracking module 214 may create or update a user profile for a user accessing the website 104 that includes the user interactions with the website 104.

The site-specific user interaction tracking module 216 may provide the user interface elements for display of personalized offers and information. As discussed further herein, for example with reference to FIG. 6B, the site-specific user interaction tracking module 216 may detect access of the user of the webpage or interactions of the user with the website 104 and send them to the tracking module 214. The tracking module 214 may update the user profile for the user to include the webpage access or the user interactions. The rules module 206 may evaluate the multiple offers for the one or more products or services of the multiple products or services and the user profile to identify multiple offers to display to the user. As discussed further herein, for example, with reference to FIG. 7A through FIG. 8B, the site-specific user interaction tracking module 216 may provide the multiple offers for display in the webpage dedicated to containing personalized offers and information. As the user continues to interact with the website 104, the site-specific user interaction tracking module 216 may detect the user interactions and send them to the tracking module 214. The user profile module 210 may update the user profile to include the user interactions. The rules module 206 may then evaluate the user profile and the multiple offers to identify new or additional offers to provide for display to the user. If so, the site-specific user interaction tracking module 216 may provide the offers to the user interface element for display.

In various embodiments, the user profile module 210 may utilize other data to create and/or update the user profile, such as data that the user provides to the website. Such data may include user interests, user work or educational information, a user email address, and any other data that the user may provide. The user profile module 210 may also utilize data obtained from sources other than the user to update create and/or update the user profile.

In some embodiments, the offers may be part of or included in a campaign. The offer and campaign module 208 may determine that the user interactions satisfy one or more criteria for activating a campaign. The campaign may be linked with multiple offers for one or more products or services of the multiple products or services that the website 104 provides. If the offer and campaign module 208 determines that the user interactions satisfy the one or more criteria, the offer and campaign module 208 may activate the campaign. The site-specific user interaction tracking module 216 may then detect interactions of the user with the website 104 and send them to the tracking module 214.

As the user accesses products or services pages of the website 104, the site-specific user interaction tracking module 216 may obtain information regarding products or services. The information may include product or service names, product or service prices, product or service images, and product or service stock level. The site-specific user interaction tracking module 216 may send the information regarding the products or services to the tracking module 214 for storage in the products datastore 222. The product recommendation module 204 may then access the stored information regarding the products or services to generate product recommendations. In some embodiments, the personalized offer and information system 108 populates the products datastore 222 using information from a third-party product feed provider.

Figure 6B:
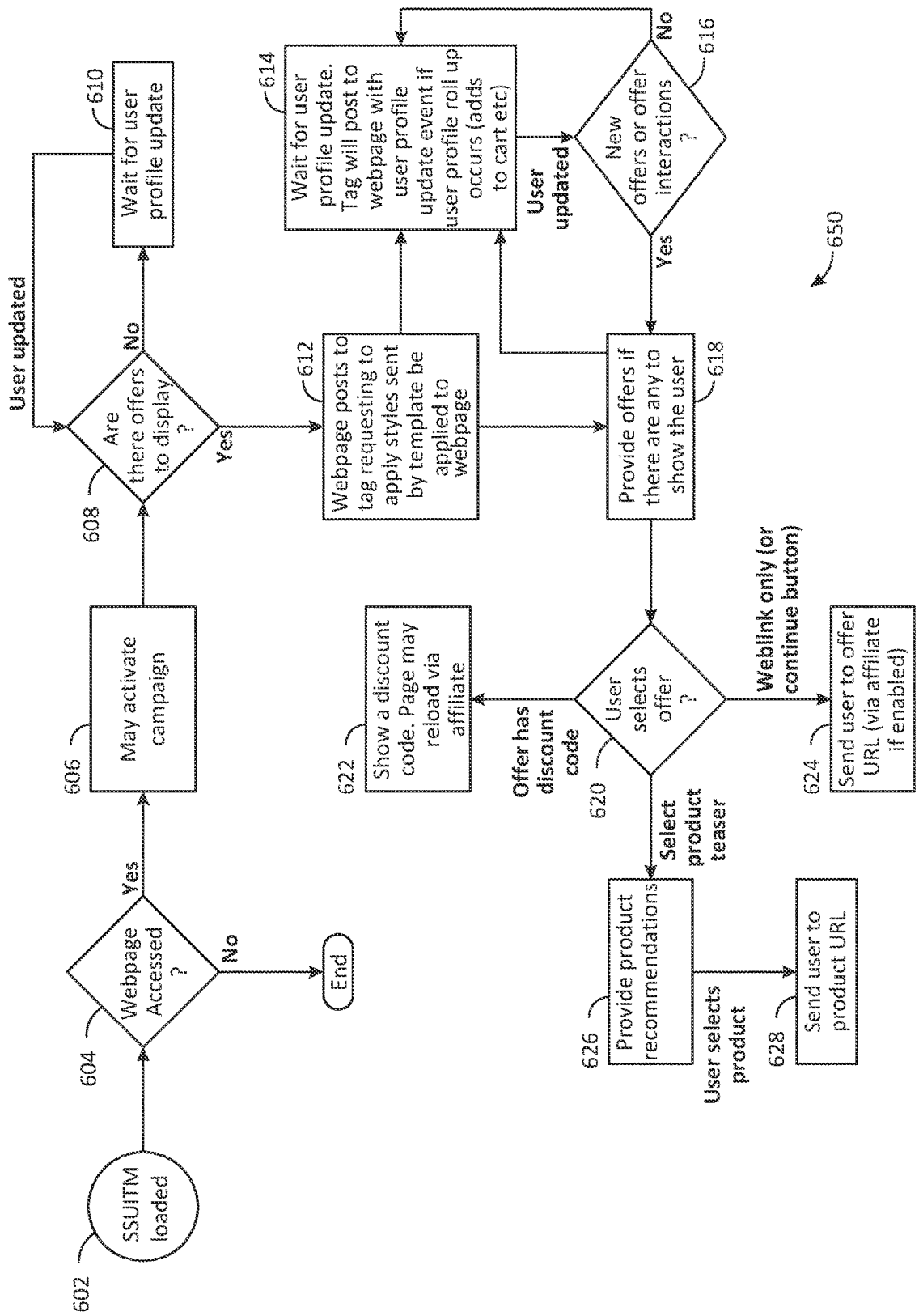
FIG. 6B is a flow diagram depicting a method for generating personalized offers and
information in some embodiments.

FIG. 6B is a flow diagram depicting a method 650 for providing personalized offers and recommendations in some embodiments. The personalized offer and information system 108 may perform the method 650. The method 650 begins at step 602, where the site-specific user interaction tracking module 216, which may be or include a tag as described herein, is loaded.

At step 604, the site-specific user interaction tracking module 216 determines whether the user has accessed the webpage containing personalized offers and information by detecting access of the user of the webpage containing personalized offers and information. In some embodiments, the site-specific user interaction tracking module 216 detects any interaction with the website 104 by the user, a user agent of the user, and/or the user being in a particular segment or group. Other detected interactions will be apparent.

If the site-specific user interaction tracking module 216 detects access of the user of the webpage, the method 650 continues at step 606, where the offer and campaign module 208 may activate a campaign. As discussed herein, personalized offers and information may be part of or included in a campaign. The campaign may be activated after the site-specific user interaction tracking module 216 has detected that the user has accessed the webpage. The campaign may include multiple offers for the multiple products or services that the website 104 provides for sale. The offer and campaign module 208 may determine whether to provide the user with one or more offers of multiple offers for one or more products or services of the multiple products or services that the website 104 provides for sale. In some embodiments, the site-specific user interaction tracking module 216 does not activate a campaign, that is, the offer and campaign module 208 may provide personalized offers and information without the personalized offers and information being included in or part of a campaign.

In some embodiments, offers are included in or are part of a campaign that is defined by a user associated with an entity operating the website. The site-specific user interaction tracking module 216 may detect a user accessing the webpage containing personalized offers and information and activate the campaign. Alternatively, the site-specific user interaction tracking module 216 may detect a user accessing any part of the website and activate the campaign. In various embodiments, the campaign may have one or more activation criteria of the campaign that have to be satisfied in order for the site-specific user interaction tracking module 216 to activate the campaign.

As discussed herein, a campaign may have a name, a description, a status, a visibility, which may be always visible or visible from a start date and time to an end date and time, and a theme. The theme may determine the look and feel of offers and personalized information provided for display. As discussed herein, for example with reference to FIGS. 5A-C, a user associated with the entity operating the website 104 may define the theme so that offers and personalized information are the same as, or are at least consistent with, a theme of the website 104. Having the theme of the offers and personalized information be the same as, or at least consistent with, the theme of the website 104 may be important to the entity operating the website 104. This is because the entity may wish users to have a seamless and consistent experience in viewing products or services and viewing offers. Such a seamless and consistent experience may help to build trust and brand loyalty. The entity may also determine whether to provide product recommendations for the campaign. If so, then certain offer types, such as discount code offers, may include product recommendations, and offer types such as product recommendations offers may be displayed to users of the website 104.

At step 608, the offer and campaign module 208 determines whether there are offers and/or personalized information to display to the user. As discussed herein, the personalized offer and information system 108 may provide several types of offers, such as weblink offers, discount code offers, and product recommendation offers. The offer and campaign module 208 may evaluate the multiple offers and the user profile to identify one or more particular offers of the multiple offers to display to the user. The offer and campaign module 208 may identify one or more rules associated with the multiple offers. The one or more rules may each have one or more conditions. The offer and campaign module 208 may evaluate the one or more rules and the user profile to determine if the one or more conditions are met. For example, a rule may include the condition that a value of products or services the user has selected for purchase has to exceed a threshold amount. An offer that has that rule will show only if the rule conditions are met. As another example, a rule may include the conditions that the user is located in a specific geographic area and that a forecasted maximum temperature for the specific geographic area is not to exceed a threshold temperature. An offer that has that rule will only show if both rule conditions are met. An offer may not have any rules associated with it. Such an offer may be shown to the user without any conditions having to be met.

The user profile module 210 may create and/or update the user profile to include user interactions with the website 104. The user interactions may include products the user has viewed or selected for purchase. The user interactions may also include attributes of the user device 102, such as a location of the user device 102 (for example, a city, country, a geofenced location, or a time zone). The user interactions may also include a day or time of the user device 102 (for example, a day of the month, a day of the week, a time of day). The user interactions may also include a weather of a location of the user device 102, a determined propensity or predilection of the user to purchase products or services, and other attributes of the user or website user device 102 (for example, product engagement, user profile, user behavior, user segment or group). The user interactions may also be used to determine the amount of an offer. For example, a website user with a very low predilection score or a very high predilection score may be provided with a minimal or low offer, because the website user is either very unlikely to purchase or very likely to purchase. The personalized offer and information system 108 may provide a website user with an average predilection score with a good offer, because such a website user may or may not purchase a product or service, and thus it may be desirable to incentivize the website user to purchase a product or service by providing the website user with an attractive offer.

The personalized offer and information system 108 may allow for the utilization of segments to target website users. A segment may be a grouping or collection of one or more website users based upon activities, actions, and/or attributes of the website users. For example, a segment may be defined as users who have selected an item for purchase from the website 104 that is above the average item price of items on the website 104. As another example, a segment may be defined as users who have selected an item for purchase from the website 104 but have not purchased the item in the previous seven days. The personalized offer and information system 108 may allow for the creation of segments based on other activities, actions, and/or attributes of the users. In some embodiments, the personalized offer and information system 108 provides a number of predefined segments for use in targeting users.

If the offer and campaign module 208 determines that there are no offers to provide for display, the method 650 continues to step 610, where the offer and campaign module 208 waits for an update to occur to the user profile. If the user profile module 210 updates the user profile, then the method returns to step 608. If the offer and campaign module 208 determines that there are offers to provide for display, then the method 650 continues to step 612. At step 612, the user interface module 218 may post to the site-specific user interaction tracking module 216 requesting to apply styles sent by the user interface module 218 be applied to offers and personalized information. The styles may define the theme of the offers and personalized information provided for display. After step 612, the method 650 may continue to step 614 or step 618.

At step 618, if there are any offers and/or personalized information to be provided for display to the user, the offer and campaign module 208 generates offers and/or personalized information for display to the first user and provides the offers and/or personalized information for display to the user. In some embodiments, the offer and campaign module 208 generates the offers for display to the first user at substantially the same time as the site-specific user interaction tracking module 216 detects access to the webpage of the user. In other words, the detection of access by the user and the generation and provision of the offers occurs substantially in real time, with no meaningful lag or delay. In various embodiments, instead of the offer and campaign module 208 generating offers and/or personalized information on demand, the offer and campaign module 208 provides offers and/or personalized information that was generated at a time prior to the user accessing the website.

Figure 7A:
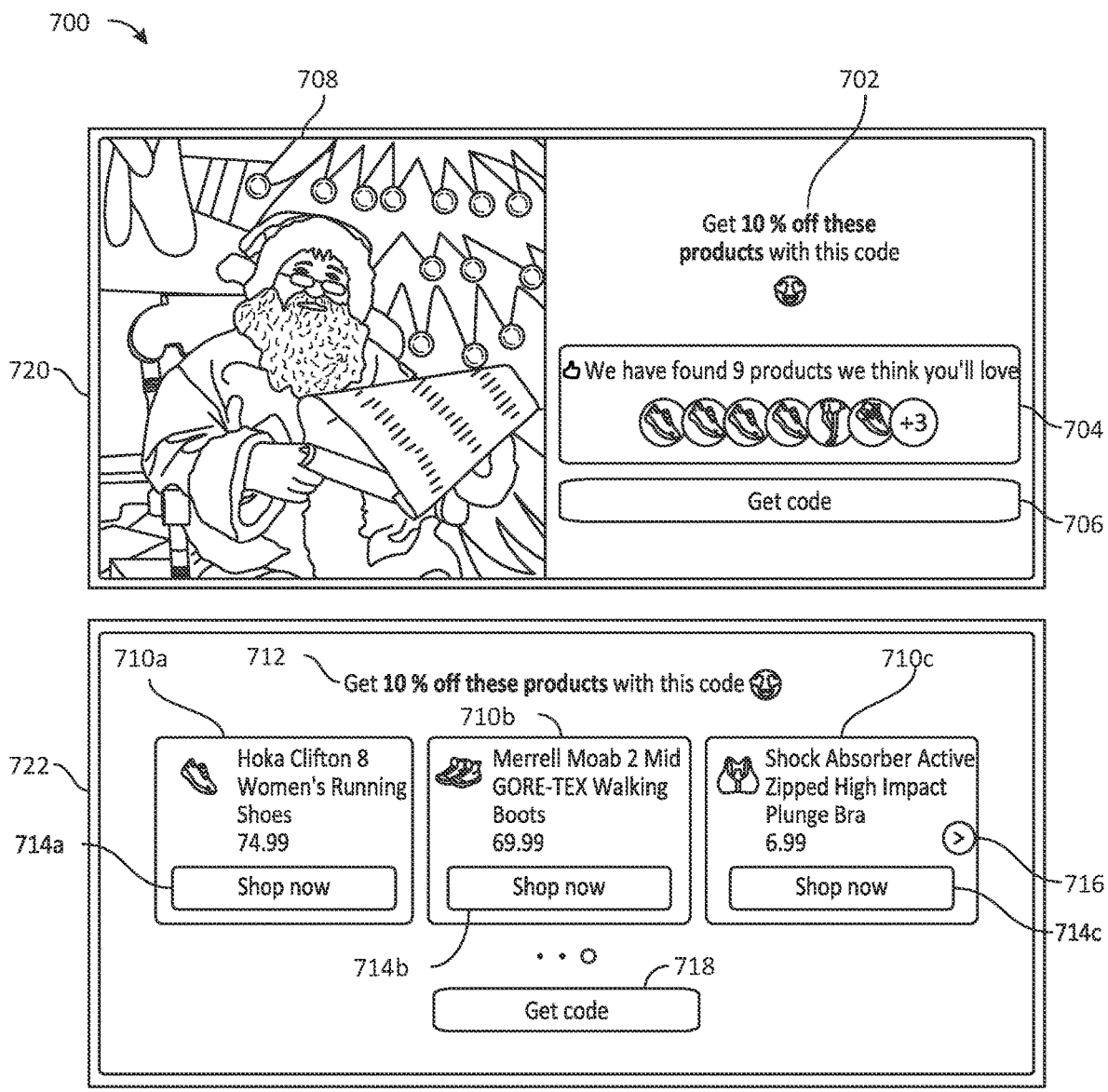
FIG. 7A depicts an example personalized offer and example personalized product recommendations in some embodiments.

FIG. 7A depicts an example personalized offer and example personalized product recommendations 700 in some embodiments. The personalized offer and example personalized product recommendations 700 includes a discount code offer 720 that includes an offer title 702, an offer image 708, and a button 706 providing a call-to-action ("Get Code"). The discount code offer 720 also includes a group 704 of recommended products. The user profile module 210 may identify product recommendations based on the user profile. The personalized offer and example personalized product recommendations 700 also includes a user interface element 722 that includes a title 712 and multiple product recommendations 710 (shown individually as product recommendations 710*a-c*). Each product recommendation 710 includes information about the recommended product, such as a product name, a product price, a product image, and a button 714 (shown individually as buttons 714*a-c*) that if selected by the user causes the corresponding product page to be accessed. The user interface element 722 also includes an arrow 716 that if selected causes other recommended products in the group 704 to be displayed. The user interface element 722 also includes a button 718 providing a call-to-action ("Get Code") that if selected may cause the discount code to be displayed. In some embodiments, the user selecting the call-to-action button 718 causes the user interface module 218 to display a pop-up window (not illustrated in FIG. 7A) that includes another button providing a call-to-action (for example, "Copy Code and Go to Offer") that, if selected by the user, causes the discount code to be copied and the product webpage for the recommended products to be accessed.

Figure 7B:
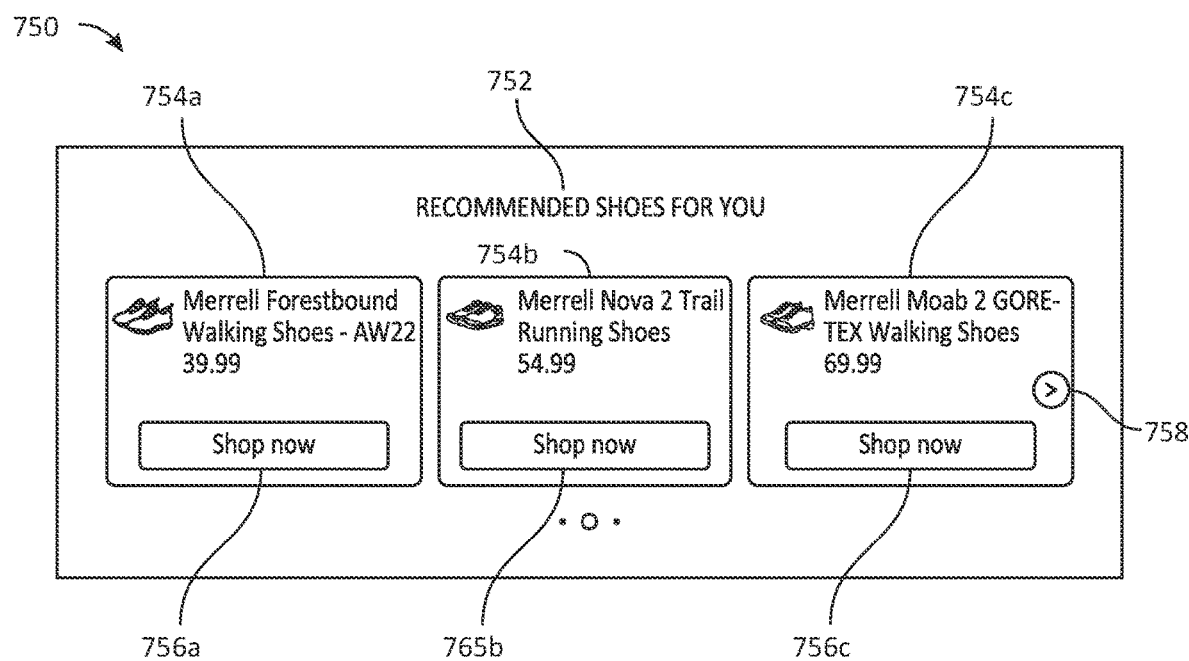
FIG. 7B depicts example personalized product recommendations in some embodiments.

FIG. 7B depicts example personalized product recommendations 750 in some embodiments. The personalized product recommendations 750 includes an offer title 752, multiple recommended products 754 (shown individually as recommended products 754*a-c*), and multiple buttons 756 (shown individually as buttons 756*a-c*) providing calls-to-action ("Shop Now"). The personalized product recommendations 750 also includes an arrow 758 that if selected causes other recommended products to be displayed.

Returning to the method 650 of FIG. 6B, at step 614, if a user profile update has occurred, the site-specific user interaction tracking module 216 sends additional offers or information to the webpage. At step 616, if there are no new offers or offer interactions, the method 650 returns to step 614. If there are new offers or offer interactions, the method continues to step 618. After step 618, the method may return to step 614, or to step 620. At step 620, the site-specific user interaction tracking module 216 determines if the user selects an offer. If the offer is a discount code offer and the user selects it, the method continues to step 622, where the user interface module 218 displays the discount code. If the offer is a weblink offer type, if the user selects it, the method 650 continues at step 624 where the user interface module 218 sends the user to the offer URL. If the offer is a product recommendations offer, or if it is another type of offer that includes product recommendations, and the user selects product recommendations, the method continues at step 626, where the user interface module 218 displays product recommendations. If the user selects a product, the user interface module 218 sends the user to the product URL at step 628.

In some embodiments, the site-specific user interaction tracking module 216 may load a panel. For example, the panel may be an iframe that is hidden from view on the website 104. The site-specific user interaction tracking module 216 may utilize the panel to provide new offers and/or personalized information and/or update existing offers and/or personalized information in the webpage.

Figure 8A:
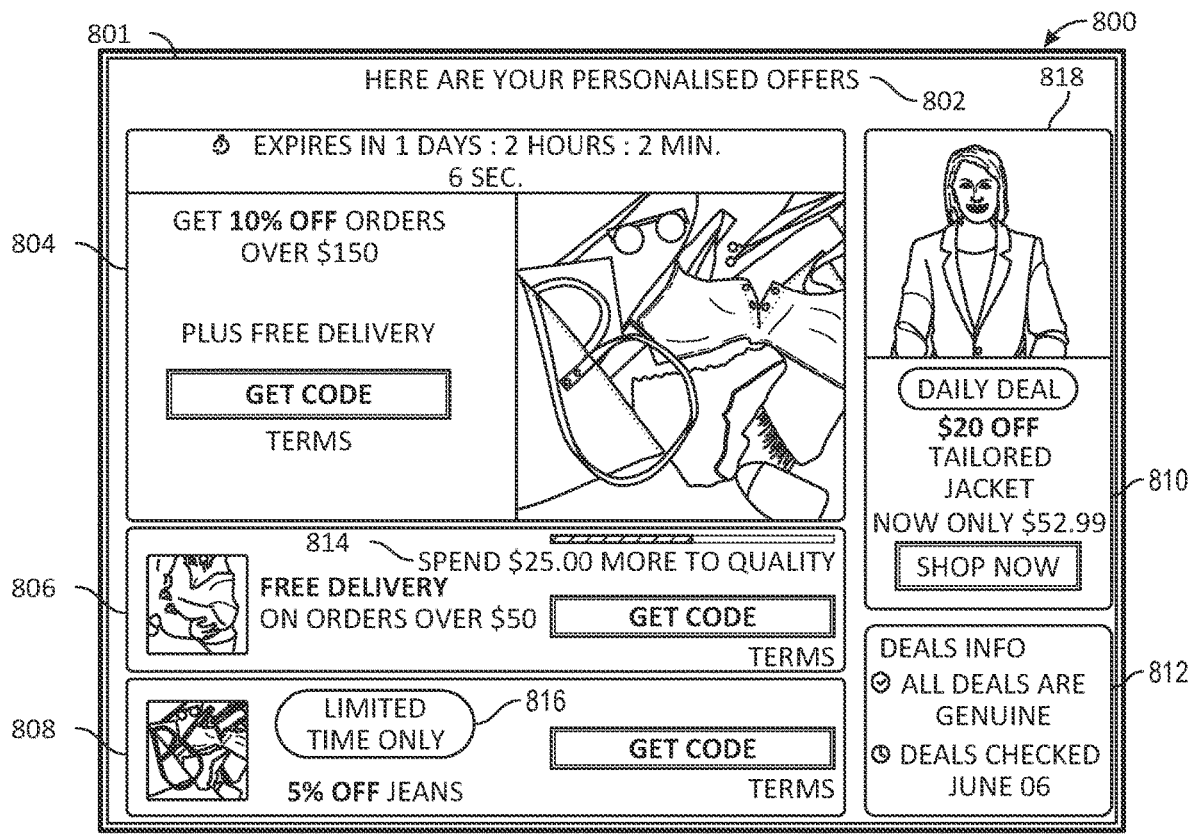
FIG. 8A depicts an example user interface for displaying multiple example personalized offers in some embodiments.

FIG. 8A depicts an example user interface 800 for displaying offers in an offer group in some embodiments. A webpage on the website 104 may provide the user interface 800. The user interface 800 includes an offer group 801. The offer group 801 has a title 802 and includes multiple offers. A first offer 804 may be featured and accordingly, is larger than other offers in the offer group 801. The first offer 804 is a discount code offer. A second offer 806 is also a discount code offer and includes a progress bar 814 showing a dollar amount of items that the user still has to select for purchase in order to qualify for the offer. A third offer 808 includes a label 816 and is a discount code offer. A fourth offer 810 includes an image 818 that is larger than the images in the second offer 806 and the third offer 808. The fourth offer 810 is a weblink offer directing the user to a particular product that is discounted by a particular amount.

The offer group 801 also includes a deals info section 812 that notifies the user that all the deals are genuine and the last date the deals were checked. The personalized offer and information system 108 may provide the user interface 800 for display on a website 104. This has the effect of incentivizing users to access the website 104 to find discount codes or offers instead of searching for such discount codes or offers using search engines. Accordingly, the technology described herein may result in users spending more time on websites 104 that use the personalized offer and information system 108 instead of other websites.

Figure 8B:
FIG. 8B depicts an example user interface for displaying multiple example offers in an offer group in some embodiments.

FIG. 8B depicts another example user interface 850 for displaying offers in an offer group in some embodiments. A webpage on the website 104 may provide the user interface 850, or another website may provide the user interface 850. The user interface 850 includes an offer group 851. The offer group 851 has an offer title 852 and an offer subtitle 854. The offer group 851 includes a first offer 856, a second offer 858, and a third offer 860. Each of the first offer 856, the second offer 858, and the third offer 860 is a weblink offer and includes a weblink to a different product categories. The offer group 851 also includes a left navigation arrow 864a and a right navigation arrow 864b that allow the user to navigate to different offers in the offer group 851. The offer group 851 also includes a button 862 providing a call-to-action ("Shop All Deals"). If a user selects the button 862, the user interface module 218 may display a page listing all products for which there are offers.

Figure 9:
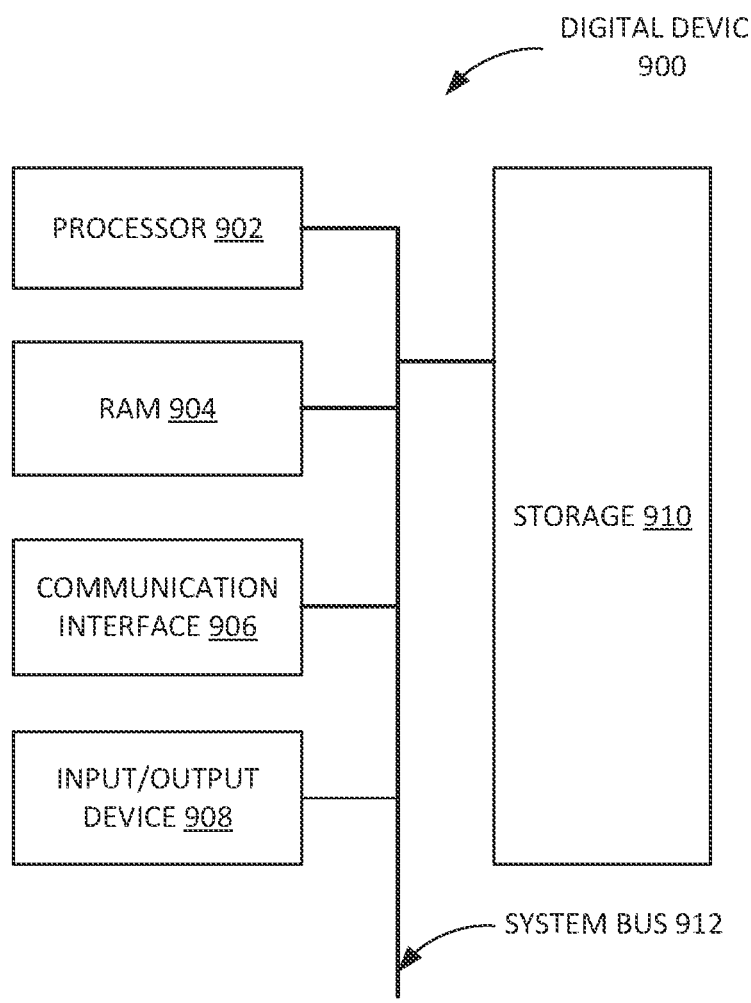
FIG. 9 depicts a block diagram of an example digital device in some embodiments.

FIG. 9 depicts a block diagram of an example digital device 900 according to some embodiments. The digital device 900 is shown in the form of a general-purpose computing device. The digital device 900 includes at least one processor 902, RAM 904, communication interface 906, input/output device 908, storage 910, and a system bus 912 that couples various system components including storage 910 to the at least one processor 902. A system, such as a computing system, may be or include one or more of the digital device 900.

System bus 912 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The digital device 900 typically includes a variety of computer system readable media, such as computer system readable storage media. Such media may be any available media that is accessible by any of the systems described herein and it includes both volatile and nonvolatile media, removable and non-removable media.

In some embodiments, the at least one processor 902 is configured to execute executable instructions (for example, programs). In some embodiments, the at least one processor 902 comprises circuitry or any processor capable of processing the executable instructions.

In some embodiments, RAM 904 stores programs and/or data. In various embodiments, working data is stored within RAM 904. The data within RAM 904 may be cleared or ultimately transferred to storage 910, such as prior to reset and/or powering down the digital device 900.

In some embodiments, the digital device 900 is coupled to a network, such as the communication network 110, via communication interface 906. Still yet, the user device 102, the website 104, the computing system 106, and the personalized offer and information system 108 can communicate with one or more networks such as a local area network (LAN), a general wide area network (WAN), and/or a public network (for example, the Internet).

In some embodiments, input/output device 908 is any device that inputs data (for example, mouse, keyboard, stylus, sensors, etc.) or outputs data (for example, speaker, display, virtual reality headset).

In some embodiments, storage 910 can include computer system readable media in the form of non-volatile memory, such as read only memory (ROM), programmable read only memory (PROM), solid-state drives (SSD), flash memory, and/or cache memory. Storage 910 may further include other removable/non-removable, volatile/non-volatile computer system storage media. By way of example only, storage 910 can be provided for reading from and writing to a non-removable, non-volatile magnetic media. The storage 910 may include a non-transitory computer-readable medium, or multiple non-transitory computer-readable media, which stores programs or applications for performing functions such as those described herein with reference to, for example, FIG. 2. Although not shown, a magnetic disk drive for reading from and writing to a removable, non-volatile magnetic disk (for example, a "floppy disk"), and an optical disk drive for reading from or writing to a removable, non-volatile optical disk such as a CDROM, DVD-ROM or other optical media can be provided. In such instances, each can be connected to system bus 912 by one or more data media interfaces. As will be further depicted and described below, storage 910 may include at least one program product having a set (for example, at least one) of program modules that are configured to carry out the functions of embodiments of the invention. In some embodiments, RAM 904 is found within storage 910.

Programs/utilities, having a set (at least one) of program modules, such as the personalized offer and information system 108, may be stored in storage 910 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with the digital device 900. Examples include, but are not limited to microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure.

It will be appreciated that aspects of one or more embodiments may be embodied as a system, method, or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a solid state drive (SSD), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program or data for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python, or the like and conventional procedural programming languages, such as the "C" programming language or similar programming languages. The computer program code may execute entirely on any of the systems described herein or on any combination of the systems described herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented concurrently or in parallel or may be performed at different times. Further any specific numbers noted herein are only examples: alternative implementations may employ differing values or ranges.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Furthermore, any specific numbers noted herein are only examples: alternative implementations may employ differing values or ranges.

Components may be described or illustrated as contained within or connected with other components. Such descriptions or illustrations are examples only, and other configurations may achieve the same or similar functionality. Components may be described or illustrated as "coupled", "couplable", "operably coupled", "communicably coupled" and the like to other components. Such description or illustration should be understood as indicating that such components may cooperate or interact with each other, and may be in direct or indirect physical, electrical, or communicative contact with each other.

Components may be described or illustrated as "configured to", "adapted to", "operative to", "configurable to", "adaptable to", "operable to" and the like. Such description or illustration should be understood to encompass components both in an active state and in an inactive or standby state unless required otherwise by context.

The use of "or" in this disclosure is not intended to be understood as an exclusive "or." Rather, "or" is to be understood as including "and/or." For example, the phrase "providing products or services" is intended to be understood as having several meanings: "providing products," "providing services", and "providing products and services."

It may be apparent that various modifications may be made, and other embodiments may be used without departing from the broader scope of the discussion herein. For example, while the website 104 may be described as providing products for sale, the website 104 may provide products or services for sale, license or lease. Such products or services may be tangible or intangible (for example, software applications).

Therefore, these and other variations upon the example embodiments are intended to be covered by the disclosure herein.

The invention claimed is:

1. A non-transitory computer-readable medium comprising executable instructions, the executable instructions being executable by one or more processors to perform a method, the method comprising:
   detecting, using a first user interaction tracking module associated with a first website, first access of a first user of a first webpage that is part of the first website, the first website providing multiple first products for sale and operated by a first entity, the first user interaction tracking module provided by an offer aggregator entity, the offer aggregator entity distinct from the first entity, the first website having a first theme providing a first look and feel for the first website;
   generating a first set of decision trees trained on first data including first user profile data stored by a system of the offer aggregator entity, the first user profile data including first values of the multiple first products purchased from the first website and multiple first products selected for purchase from the first website;
   accessing a first profile of the first user;
   providing the first profile of the first user to the first set of decision trees to generate a first propensity of the first user to purchase at least one of the multiple first products;
   identifying, based on the first profile of the first user and the first propensity of the first user, multiple first offers to provide to the first user, each first offer of the multiple first offers defined by the first entity and having offer attributes including a first offer title and a first reference to one or more first products of the multiple first products, at least one first offer of the multiple first offers having an expiration date and time and further including a countdown, the countdown indicating the expiration date and time or an amount of time before the expiration date and time;
   providing for display to the first user in the first webpage the multiple first offers, each first offer for display including the first offer title and the first reference to the one or more first products, the at least one first offer further including the countdown, each first offer having the first theme;
   detecting, using a second user interaction tracking module associated with a second website, second access of a second user of a second webpage that is part of the second website, the second website providing multiple second products for sale and operated by a second entity, the second user interaction tracking module provided by the offer aggregator entity, the offer aggregator entity distinct from the second entity, the second website having a second theme providing a second look and feel for the second website, the second theme different from the first theme;
   generating a second set of decision trees trained on second data including second user profile data stored by the system of the offer aggregator entity, the second user profile data including second values of the multiple second products purchased from the second website and multiple second products selected for purchase from the second website;
   accessing a second profile of the second user;
   providing the second profile of the second user to the second set of decision trees to generate a second propensity of the second user to purchase at least one of the multiple second products;
   identifying, based on the second profile of the second user and the second propensity of the second user, multiple second offers to provide to the second user, each second offer of the multiple second offers defined by the second entity and having offer attributes including a second offer title and a second reference to one or more second products of the multiple second products, at least one second offer of the multiple second offers further including a discount code, a threshold value of second products to be selected for purchase to be met to qualify for the discount code, and a progress indicator, the progress indicator indicating a progress of the second user in qualifying for the discount code; and
   providing for display to the second user in the second webpage the multiple second offers, each second offer for display including the second offer title and the second reference to the one or more second products, the at least one second offer further including the progress indicator, each second offer having the second theme.

2. The non-transitory computer-readable medium of claim 1, the method further comprising:
   determining that the second user has selected one or more second products of the multiple second products for purchase;
   updating the progress indicator to obtain an updated progress indicator, the updated progress indicator indicating the progress of the second user in qualifying for the discount code; and
   providing for display the updated progress indicator in the at least one second offer.

3. The non-transitory computer-readable medium of claim 1, the method further comprising:
   receiving the first theme for the multiple first offers;
   associating the first theme with the multiple first offers;
   receiving the second theme for the multiple second offers; and
   associating the second theme with the multiple second offers.

4. The non-transitory computer-readable medium of claim 3, the method further comprising:
   providing for display a user interface having a user interface element for receiving an address of a website;
   receiving a first address of the first website in the user interface element of the user interface;
   receiving a first request to obtain the first theme from the first website using the first address;
   receiving a second address of the second website in the user interface element of the user interface; and
   receiving a second request to obtain the second theme from the second website using the second address;
   wherein receiving the first theme for the multiple first offers includes obtaining, using the first address, the first theme from the first website, and wherein receiving the second theme for the multiple second offers includes obtaining, using the second address, the second theme from the second website.

5. The non-transitory computer-readable medium of claim 1, the method further comprising identifying one or more first rules associated with the multiple first offers, at least one first rule of the one or more first rules including at least one first condition, and wherein identifying, based on the first profile of the first user, the multiple first offers to provide to the first user includes determining that the at least one first condition of the at least one first rule is met.

6. The non-transitory computer-readable medium of claim 1, the method further comprising identifying one or more priorities associated with the multiple first offers, and wherein providing for display to the first user the multiple first offers includes providing for display to the first user the multiple first offers in an order based on the one or more priorities associated with the multiple first offers.

7. The non-transitory computer-readable medium of claim 1 wherein the at least one first offer further includes at least one of a discount code for the one or more first products and a link to the one or more first products.

8. The non-transitory computer-readable medium of claim 1, the method further comprising generating the multiple first offers for display to the first user, wherein generating the multiple first offers for display to the first user occurs at substantially a same time as detecting, using the first user interaction tracking module associated with the first website providing multiple first products for sale, the first access of the first user of the first webpage that is part of the first website occurs at a first time.

9. A method comprising:
    detecting, using a first user interaction tracking module associated with a first website, first access of a first user of a first webpage that is part of the first website, the first website providing multiple first products for sale and operated by a first entity, the first user interaction tracking module provided by an offer aggregator entity, the offer aggregator entity distinct from the first entity, the first website having a first theme providing a first look and feel for the first website;
    generating a first set of decision trees trained on first data including first user profile data stored by a system of the offer aggregator entity, the first user profile data including first values of the multiple first products purchased from the first website and multiple first products selected for purchase from the first website;
    accessing a first profile of the first user;
    providing the first profile of the first user to the first set of decision trees to generate a first propensity of the first user to purchase at least one of the multiple first products;
    identifying, based on the first profile of the first user and the first propensity of the first user, multiple first offers to provide to the first user, each first offer of the multiple first offers defined by the first entity and having offer attributes including a first offer title and a first reference to one or more first products of the multiple first products;
    providing for display to the first user in the first webpage the multiple first offers, each first offer for display including the first offer title and the first reference and having the first theme;
    detecting, using a second user interaction tracking module associated with a second website, second access of a second user of a second webpage that is part of the second website, the second website providing multiple second products for sale and operated by a second entity, the second user interaction tracking module provided by the offer aggregator entity, the offer aggregator entity distinct from the second entity, the second website having a second theme providing a second look and feel for the second website, the second theme different from the first theme;
    generating a second set of decision trees trained on second data including second user profile data stored by the system of the offer aggregator entity, the second user profile data including second values of the multiple second products purchased from the second website and multiple second products selected for purchase from the second website;
    accessing a second profile of the second user;
    providing the second profile of the second user to the second set of decision trees to generate a second propensity of the second user to purchase at least one of the multiple second products;
    identifying, based on the second profile of the second user and the second propensity of the second user, multiple second offers to provide to the second user, each second offer of the multiple second offers defined by the second entity and having offer attributes including a second offer title and a second reference to one or more second products of the multiple second products; and
    providing for display to the second user in the second webpage the multiple second offers, each second offer for display including the second offer title and the second reference and having the second theme.

10. The method of claim 9 wherein at least one first offer of the multiple first offers further includes a discount code for the one or more first products, and the at least one first offer includes a selectable user interface element that when selected causes the discount code to be displayed in a pop-up window, and the method further comprises:
    providing for display the selectable user interface element in the at least one first offer;
    receiving a selection of the selectable user interface element; and
    providing for display in a pop-up window the discount code.

11. The method of claim 10 wherein the selectable user interface element is a first selectable user interface element, the pop-up window includes a second selectable user interface element that when selected causes the discount code to be copied and a product webpage for the one or more first products to be accessed, and the method further comprises:
    providing for display in the pop-up window the second selectable user interface element;
    receiving a selection of the second selectable user interface element; and
    causing the discount code to be copied and the product webpage for the one or more first products to be accessed.

12. The method of claim 9 wherein at least one first offer of the multiple first offers has an expiration date and time and further includes a countdown, the countdown indicating the expiration date and time or an amount of time before the expiration date and time, and the at least one first offer further includes the countdown.

13. The method of claim 9 wherein at least one first offer of the multiple first offers further includes a discount code, a threshold value of first products to be selected for purchase to be met to qualify for the discount code, and a progress indicator, the progress indicator indicating a progress of the first user in qualifying for the discount code, and the at least one first offer further includes the progress indicator.

14. The method of claim 13, further comprising:
    determining that the first user has selected one or more first products of the multiple first products for purchase;
    updating the progress indicator to obtain an updated progress indicator, the updated progress indicator indicating the progress of the first user in qualifying for the discount code; and providing for display the updated progress indicator in the at least one first offer.

15. The method of claim 9 further comprising:
receiving the first theme for the multiple first offers;
associating the first theme with the multiple first offers;
receiving the second theme for the multiple second offers; and
associating the second theme with the multiple second offers.

16. The method of claim 15 further comprising:
providing for display a user interface having a user interface element for receiving an address of a website;
receiving a first address of the first website in the user interface element of the user interface;
receiving a first request to obtain the first theme from the first website using the first address;
receiving a second address of the second website in the user interface element of the user interface; and
receiving a second request to obtain the second theme from the second website using the second address;
wherein receiving the first theme for the multiple first offers includes obtaining, using the first address, the first theme from the first website, and wherein receiving the second theme for the multiple second offers includes obtaining, using the second address, the second theme from the second website.

17. The method of claim 9, further comprising identifying one or more first rules associated with the multiple first offers, at least one first rule of the one or more first rules including at least one first condition, and wherein identifying, based on the first profile of the first user, the multiple first offers to provide to the first user includes determining that the at least one first condition of the at least one first rule is met.

18. The method of claim 9, further comprising identifying one or more priorities associated with the multiple first offers, and wherein providing for display to the first user the multiple first offers includes providing for display to the first user the multiple first offers in an order based on the one or more priorities associated with the multiple first offers.

19. The method of claim 9, further comprising identifying, based on the first profile of the first user, one or more recommended first products of the multiple first products, and wherein at least one first offer of the multiple first offers further includes the one or more recommended first products, and the at least one first offer further includes the one or more recommended first products.

20. A system comprising at least one processor and memory containing executable instructions, the executable instructions being executable by the at least one processor to:
detect, using a first user interaction tracking module associated with a first website, first access of a first user of a first webpage that is part of the first website, the first website providing multiple first products for sale and operated by a first entity, the first user interaction tracking module provided by an offer aggregator entity, the offer aggregator entity distinct from the first entity, the first website having a first theme providing a first look and feel for the first website;
generate a first set of decision trees trained on first data including first user profile data stored by a system of the offer aggregator entity, the first user profile data including first values of the multiple first products purchased from the first website and multiple first products selected for purchase from the first website;
access a first profile of the first user;
provide the first profile of the first user to the first set of decision trees to generate a first propensity of the first user to purchase at least one of the multiple first products;
identify, based on the first profile of the first user and the first propensity of the first user, multiple first offers to provide to the first user, each first offer of the multiple first offers defined by the first entity and having offer attributes including a first offer title and a first reference to one or more first products of the multiple first products;
provide for display to the first user in the first webpage the multiple first offers, each first offer for display including the first offer title and the first reference and having the first theme;
detect, using a second user interaction tracking module associated with a second website, second access of a second user of a second webpage that is part of the second website, the second website providing multiple second products for sale and operated by a second entity, the second user interaction tracking module provided by the offer aggregator entity, the offer aggregator entity distinct from the second entity, the second website having a second theme providing a second look and feel for the second website, the second theme different from the first theme;
generate a second set of decision trees trained on second data including second user profile data stored by the system of the offer aggregator entity, the second user profile data including second values of the multiple second products purchased from the second website and multiple second products selected for purchase from the second website;
access a second profile of the second user;
provide the second profile of the second user to the second set of decision trees to generate a second propensity of the second user to purchase at least one of the multiple second products;
identify, based on the second profile of the second user and the second propensity of the second user, multiple second offers to provide to the second user, each second offer of the multiple second offers defined by the second entity and having offer attributes including a second offer title and a second reference to one or more second products of the multiple second products; and
provide for display to the second user in the second webpage the multiple second offers, each second offer for display including the second offer title and the second reference and having the second theme.

* * * * *